(12) United States Patent
Nakatani et al.

(10) Patent No.: US 7,936,481 B2
(45) Date of Patent: May 3, 2011

(54) METHOD, SYSTEM AND PROGRAM FOR FORMING AN IMAGE

(75) Inventors: Akihiko Nakatani, Kawasaki (JP); Makoto Torigoe, Setagaya-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 1046 days.

(21) Appl. No.: 11/041,104

(22) Filed: Jan. 21, 2005

(65) Prior Publication Data

US 2005/0168495 A1  Aug. 4, 2005

(30) Foreign Application Priority Data

Jan. 30, 2004  (JP) ................................. 2004-024841
Jan. 30, 2004  (JP) ................................. 2004-024843

(51) Int. Cl.
  *G09G 5/10*  (2006.01)
(52) U.S. Cl. ............. 358/3.1; 345/690; 345/83; 347/19; 358/1.9; 358/1.4; 358/521; 358/518; 382/167; 382/162
(58) Field of Classification Search ............. 347/43, 347/15, 73, 19; 358/1.4, 1.9, 3.1, 520, 521, 358/518, 501; 345/619, 690, 83; 382/163, 382/232, 162, 167
See application file for complete search history.

(56) References Cited

U.S. PATENT DOCUMENTS

| | | | | |
|---|---|---|---|---|
| 5,557,712 A * | 9/1996 | Guay | ............................. | 345/611 |
| 6,336,705 B1 * | 1/2002 | Torigoe | ............................. | 347/43 |
| 6,377,366 B1 * | 4/2002 | Usami | ............................. | 358/520 |
| 6,593,935 B2 * | 7/2003 | Imaizumi et al. | ............. | 345/619 |
| 7,213,898 B2 * | 5/2007 | Hara | ............................. | 347/15 |
| 7,320,510 B2 * | 1/2008 | Nakamura et al. | ............. | 347/15 |
| 7,327,492 B2 * | 2/2008 | Yokochi | ............................. | 358/1.9 |
| 2002/0071041 A1 * | 6/2002 | Pine | ............................. | 348/222 |
| 2002/0163655 A1 * | 11/2002 | Zhou | ............................. | 358/1.4 |
| 2003/0085941 A1 * | 5/2003 | Tezuka et al. | ............. | 347/19 |

FOREIGN PATENT DOCUMENTS

| | | |
|---|---|---|
| EP | 1217047 A2 | 6/2002 |
| EP | 1289269 A2 * | 3/2003 |
| JP | 08-216433 A | 8/1996 |
| JP | 10-110127 A | 4/1998 |
| JP | 2002-118761 A | 4/2002 |
| JP | 2002-331693 A | 11/2002 |
| JP | 2003-143422 A | 5/2003 |
| JP | 2003-147238 A | 5/2003 |

* cited by examiner

*Primary Examiner* — Edward L Coles
*Assistant Examiner* — Ashish K Thomas
(74) *Attorney, Agent, or Firm* — Canon U.S.A. Inc. I.P. Division

(57) ABSTRACT

A high-quality monochrome photographic image is formed using a high-resolution color ink-jet recording apparatus. When a monochrome mode is selected, density signals are produced such that they include at least one density signal corresponding to a chromatic color material and a density signal corresponding to an achromatic color material and having a value greater than the value of the at least one density signal corresponding to the chromatic color material. A slight recorded color deviation that can occur when the achromatic color material is recorded on a recording medium is compensated for by adding a small amount of chromatic color material having a hue which cancels out the recorded color deviation. Thus, a high-quality gray scale image is obtained without having recorded color deviation or color transition.

11 Claims, 11 Drawing Sheets

METHOD, SYSTEM AND PROGRAM FOR FORMING AN IMAGE

BACKGROUND OF THE INVENTION

1. Field of the Invention

The present invention relates to a method, system and program for forming a gray scale image using an image forming system capable of outputting a color image.

An example of an image forming apparatus is an ink-jet printer having a plurality of color inks for outputting a color image. When an image is formed by using subtractive color mixture as is the case with the ink-jet recording apparatus, three basic colors consisting of cyan (C), magenta (M), and yellow (Y) are generally used. Use of this combination of colors allows representation of not only hues of cyan, magenta and yellow but also various other hues. For example, red (R) can be represented by mixing magenta and yellow. By gradually changing the ratio of amounts of inks mixed together, colors over an entire color space can be substantially represented.

However, in practice, it is very difficult to find basic color materials (C, M, and Y) having colors located at ideal coordinates in the color space. Coordinates in the color space of respective color materials deviate more or less from their ideal coordinates, and the deviation varies depending on the type of recording medium used. Further, when more ink is employed to increase the density of a color, the resultant locus in the color space does not necessarily linearly extend toward high color saturation, and the saturation tends to decrease with increasing amounts of ink in a range higher than a particular value of the density of the color. The deviation of the color of a recorded image from ideal coordinates in the color space can occur in many types of printers including the ink-jet recording apparatus. Hereinafter, such a deviation will be referred to as a "recorded color deviation".

In a printer in which recorded color deviations can occur, recording data is corrected depending on the characteristics of inks and/or a recording medium such that a recorded color becomes as close to an ideal color as possible. However, of various hues to be represented, black and gray (achromatic colors) are difficult to adjust. In the gray scale, a slight increase/decrease in amount of ink can result in a large change in hue perceptible by human eyes. Although black can be represented by mixing three basic colors, it is difficult to obtain black with a sufficiently high density even if maximum possible amounts of the three color inks are used. In recent ink-jet recording devices, to avoid the difficulty described above, black ink is added to the three basic colors. In such an ink-jet recording apparatus, when a gray scale is represented, only the black ink is used or basic color inks are used together with the black ink. Typically, pigment ink is used for the black color while dye inks are used for the basic colors.

FIG. 1 shows output values of respective color inks used to record a gray scale image using a conventional ink-jet recording apparatus. In FIG. 1, the horizontal axis represents the density level for each color of the image, the density level varying from 0 to 255. The vertical axis represents output signal values (0 to 255) of respective ink colors used to achieve the density. As can be seen from FIG. 1, in a low-density range, three colors C, M, and Y are used to form a gray image. The ratio among the output signal values of the three colors is adjusted to prevent the recorded color deviation. For a range in which the input signal value is higher than 176, a black ink (K) is used. Use of the black ink is started when the input signal value is 176. The output signal value for the black ink increases with the input signal value, up to a value of 128, which corresponds to the highest density. In FIG. 1, it is assumed that a pigment ink is used for the black ink. Note that the output curves of FIG. 1 are examples and the shapes of the curves are not limited to those shown herein. Use of the black ink may be started at a value greater or smaller than 176, and the output value of black at the maximum density (255) may be greater than 128 up to 255. The output signal values for the color inks need not be monotonically increased as shown in the example of FIG. 1. Rather, the output signal values for color inks may be decreased after use of the black ink is started.

Ink jet-recording apparatuses are also used to print photographic images that are comparable to silver halide photographs. However, granularity in such photographic images is perceptible to a user. Granularity refers to a visually perceptible rough texture that appears in an image due to ink dots used to record the image on a recording medium. In essence, images with visible granularity are considered low quality compared to silver halide photographs.

To reduce granularity, many recent ink-jet recording apparatuses use a plurality of inks that are similar in color but different in density.

FIG. 2 shows output values of respective ink colors employed by an ink-jet recording apparatus using a plurality of inks that are similar in color but different in density, wherein output values are plotted in a manner similar to FIG. 1. In this example, in addition to cyan (C), magenta (M), yellow (Y), and black (K), light cyan (LC) and light magenta (LM) with low color material density are used. As shown in FIG. 2, in the low density range, the gray scale image is formed using LC, LM and Y. If the high-density inks are used in this range, dots are formed sparsely and a visible granular texture appears. To avoid such granularity, low-density inks are used. When low-density (light color) inks are used, ink dots formed on a recording medium are not easily perceptible. In FIG. 2, as in FIG. 1, the ratio among the output signal values of the three colors is adjusted to prevent the recorded color deviation.

In the middle density range, the output signal values of LM and LC increase with the input signal value, and reach their maximum values. Densities still higher than these values cannot be obtained by using these inks. In the middle density range, an image recorded on a recording medium is fully filled with many dots, and thus granularity due to dots is not easily perceptible. To obtain higher densities, inks of C, M, and K are gradually added. This allows an increase in density while maintaining low granularity. As output values of C, M, and K are increased, the output values of LC, LM, and Y are decreased. Finally, the output value of K exceeds the output value of any other ink and the output value of K is further increased to obtain a high density for black and thus higher quality.

One method for achieving high image quality comparable to that of silver halide photographs is by forming a greater number of dots per unit area using smaller ink droplets. However, when a gray scale image is recorded using such an ink-jet recording device, the problem associated with the recorded color deviation becomes more critical.

If sizes of fired ink droplets are decreased, slight variations in characteristics of the recording (or print) head among colors can greatly influence the printed image. These variations can occur when the recording head is produced. Note that variations in amounts of fired ink droplets, which can occur over time, can also influence the printed image. In particular, when a gray scale image is recorded, a recorded color deviation, that is, a gray balance deviation that cannot be ignored occurs. The amount and the direction of recorded color deviation are uncontrollable, and the recorded color deviation can cause not only a gradual change in lightness or hue but also an abrupt transition (or "color transition") in color. Note that a color transition tends to occur in a range in which a dominant ink is switched from a low-density ink to a high-density ink.

Since current ink-jet recording apparatuses should be capable of recording high-quality images not only for color photographic images but also for monochrome photographic images, it is desirable to resolve the color deviation and the color transition problems. To achieve high quality in monochrome photographic images, it is also desirable to achieve good gray tones in the low density range and the middle density range, as will be described in detail below.

Many conventional ink-jet recording apparatuses are designed to achieve high quality for color images. For monochrome images, they are designed to achieve high quality, high contrast, and high density when text is recorded. For the middle density range and the low density range, ink-jet recording apparatuses are designed to obtain a gray tone which varies smoothly with the maximum density without having a recorded color deviation. Low granularity is also maintained.

However, in such ink-jet recording apparatuses, the quality of monochrome photographic images is lower compared to silver halide photographs. In monochrome photographic images, it is desirable to have gray tones in the low density range and the middle density range to achieve high quality. However, the hue in those ranges is not sufficiently taken into consideration in the conventional design, and thus a deviation from ideal hue occurs.

FIG. 11 shows the ideal position for gray in the $a^*b^*$ plane of the CIE–$L^*a^*b^*$ space and also shows the position for a recorded gray color corresponding to an input value of 128 shown in FIG. 2. The $a^*b^*$ plane refers to a 2-dimensional coordinate system in which hues are represented. Theoretically, an achromatic color is located at the origin of the $a^*b^*$ plane. In practice, the position in the $a^*b^*$ plane for neutral gray varies depending on the type of recording medium used. According to panel tests, coordinates of a neutral gray position are $a^*=1$ and $b^*=0$ for paper designed for dedicated use in recording apparatuses (for example, professional photo paper PR-101 available from Canon Kabushiki Kaisha). In FIG. 11, this position is denoted by M.

The position of gray obtained by conventional image processing for a density level of 128 is denoted by P. The position of P is $a^*\approx0.5$ and $b^*\approx-5$ in coordinates, and thus the position P is apart by d (color difference)$\approx5$ from M. Even such a great difference does not cause a significant problem in color images having various other colors. However, in monochrome photographic images represented using only gray tones, such a difference is perceived by users as a deviation from ideal gray.

SUMMARY OF THE INVENTION

Among other advantages, the image forming method the present invention is capable of outputting a high-quality monochrome photographic image using a good gray scale representation with color deviation or color transition. The monochrome photographic images have gray tones in the low density range and the middle density range to achieve high quality.

In a first aspect, the present invention provides an image forming method for forming an image on a recording medium based on image data and using a plurality of color materials, comprising the steps of specifying a monochrome mode to form the image, and when the monochrome mode is specified, performing image processing including the process of converting a multilevel luminance signal corresponding to the image to be formed to multilevel density signals corresponding to the respective color materials used to form the image, wherein in the image processing step, the multilevel luminance signal is converted to the multilevel density signals such that a density signal for a color material of an achromatic color is always higher than a density signal for a color material of any chromatic color over an entire range of the multilevel luminance signal.

In a second aspect, the present invention provides an image forming method for forming an image on a recording medium based on image data and using a plurality of color materials, comprising the steps of specifying a first monochrome mode or a second monochrome mode in which to form the image, when the first monochrome mode is specified, performing first image processing including the process of converting a multilevel luminance signal corresponding to the image to be formed to multilevel density signals corresponding to the respective color materials, when the second monochrome mode is specified, performing second image processing including the process of converting the multilevel luminance signal corresponding to the image to be formed to multilevel density signals corresponding to the respective color materials, forming the image on the recording medium in accordance with the multilevel density signal obtained in the first image processing or the second image processing, wherein in the first image processing, the multilevel luminance signal is converted to the multilevel density signals such that a density signal corresponding to an achromatic color material has a value smaller than a value of any density signal corresponding to a chromatic color material in a particular range of the multilevel luminance signal, and in the second image processing, the multilevel luminance signal is converted to the multilevel density signals such that a density signal corresponding to an achromatic color material has a value greater than a value of any density signal corresponding to a chromatic color material over an entire range of the multilevel luminance signal.

In a third aspect, the present invention provides an image forming method for forming an image on a recording medium based on image data and using a plurality of color materials, comprising the steps of specifying a monochrome mode to form the image in monochrome, when the monochrome mode is specified, performing image processing including the process of converting the multilevel luminance signal corresponding to the image to be formed to multilevel density signals corresponding to the respective color materials, and forming the image on the recording medium in accordance with the multilevel density signal, wherein the multilevel density signals obtained via the image processing include, over an entire density range, at least one density signal corresponding to a chromatic color material of the plurality of color materials and a density signal corresponding to a color material of an achromatic color and having a value greater than the value of the at least one density signal corresponding to the chromatic color material.

In a fourth aspect, the present invention provides a program for causing a computer to execute a process of performing signal processing on a signal corresponding to an image to be formed, the process comprising the steps of specifying a monochrome mode to form the image in monochrome, and when the monochrome mode is specified, performing image processing including the process of converting a multilevel luminance signal corresponding to the image to be formed to multilevel density signals respectively corresponding to a plurality of color materials used to form the image, wherein in the image processing step, the multilevel luminance signal is converted to the multilevel density signals such that a density signal for a color material of an achromatic color is always higher than a density signal for a color material of any chromatic color over an entire range of the multilevel luminance signal.

In a fifth aspect, the present invention provides a program for causing a computer to execute a process of performing signal processing on a signal corresponding to an image to be formed, the process comprising the steps of specifying a monochrome mode to form the image in monochrome, and when the monochrome mode is specified, performing image processing including the process of converting a multilevel luminance signal corresponding to the image to be formed to multilevel density signals respectively corresponding to a plurality of color materials used to form the image, wherein the multilevel density signals obtained via the image processing include, over an entire density range, at least one density signal corresponding to a chromatic color material of the plurality of color materials and a density signal corresponding to a color material of an achromatic color and having a value greater than the value of the at least one density signal corresponding to the chromatic color material.

In a sixth aspect, the present invention provides an image forming system for forming an image on a recording medium based on image data and using a plurality of color materials, comprising means for specifying a monochrome mode to form the image in monochrome, image processing means for, when the monochrome mode is specified, performing image processing including the process of converting a luminance signal corresponding to the image to be formed to multilevel density signals corresponding to the respective color materials, and recording means for forming the image on the recording medium in accordance with the multilevel density signals, wherein the multilevel density signals produced by the image processing means include, over an entire density range, at least one density signal corresponding to a chromatic color material of the plurality of color materials and a density signal corresponding to a color material of an achromatic color and having a value greater than the value of the at least one density signal corresponding to the chromatic color material.

According the present invention in one of the first to sixth aspects described above, it is possible to compensate for a slight recorded color deviation which occurs when an achromatic color material is recorded on a recording medium, by adding a small amount of chromatic color material which cancels out the recorded color deviation, thereby making it possible to represent high-quality gray over the entire density range without producing a recorded color deviation or a color transition.

In another aspect, the present invention provides an image forming method for forming an image on a recording medium based on image data and using a plurality of color materials, comprising the steps of specifying a monochrome mode to form the image in monochrome; when the monochrome mode is specified, performing image processing including the process of converting the multilevel luminance signal corresponding to the image to be formed to multilevel density signals corresponding to the respective color materials, and forming the image on the recording medium in accordance with the multilevel density signal, wherein the color of the image formed on the recording medium is located, in the $a^*b^*$ plane of the CIE–$L^*a^*b^*$ space, in the inside of, or on one of three sides of, a triangle whose vertices are at $(a^*, b^*)=(0, -3)$, $(a^*, b^*)=(1, 0)$ and $(a^*, b^*)=(3, 0)$ when the luminance signal has the center value of the full range of the luminance signal.

In another aspect, the present invention provides an image forming system for forming an image on a recording medium based on image data and using a plurality of color materials, comprising means for specifying a monochrome mode to form the image in monochrome, image processing means for, when the monochrome mode is specified, performing image processing including the process of converting the multilevel luminance signal corresponding to the image to be formed to multilevel density signals corresponding to the respective color materials, and recording means for forming the image on the recording medium in accordance with the multilevel density signals, wherein the color of the image formed on the recording medium is located, in the $a^*b^*$ plane of the CIE–$L^*a^*b^*$ space, in the inside of, or on one of three sides of, a triangle whose vertices are at $(a^*, b^*)=(0, -3)$, $(a^*, b^*)=(1, 0)$ and $(a^*, b^*)=(3, 0)$ when the luminance signal has the center value of the full range of the luminance signal.

In another aspect, the present invention provides an image forming method for forming an image on a recording medium based on image data and using a plurality of color materials, comprising the steps of specifying a monochrome mode to form the image in monochrome, when the monochrome mode is specified, performing image processing including the process of converting the multilevel luminance signal corresponding to the image to be formed to multilevel density signals corresponding to the respective color materials, and forming the image on the recording medium in accordance with the multilevel density signal, wherein the color of the image formed on the recording medium is located, in the $a^*b^*$ plane of the CIE–$L^*a^*b^*$ space, in the inside of, or on one of three sides of, a triangle whose vertices are at $(a^*, b^*)=(0, -3)$, $(a^*, b^*)=(1, 0)$ and $(a^*, b^*)=(3, 0)$ when the multilevel density signal has a value at which the dot coverage on the recording medium is substantially equal to 100%.

According to the present invention in one of seventh to ninth aspects, it is possible to represent a good gray tone in a gray level range which is most important in monochrome photographic images, thereby making it possible to record a monochrome photographic image with high quality close to that of silver halide photographs.

Further features and advantages of the present invention will become apparent from the following description of exemplary embodiments with reference to the attached drawings.

DETAILED DESCRIPTION OF THE EMBODIMENTS

Referring to the accompanying drawings, embodiments of the present invention are described below.

First Embodiment

Figure 3:
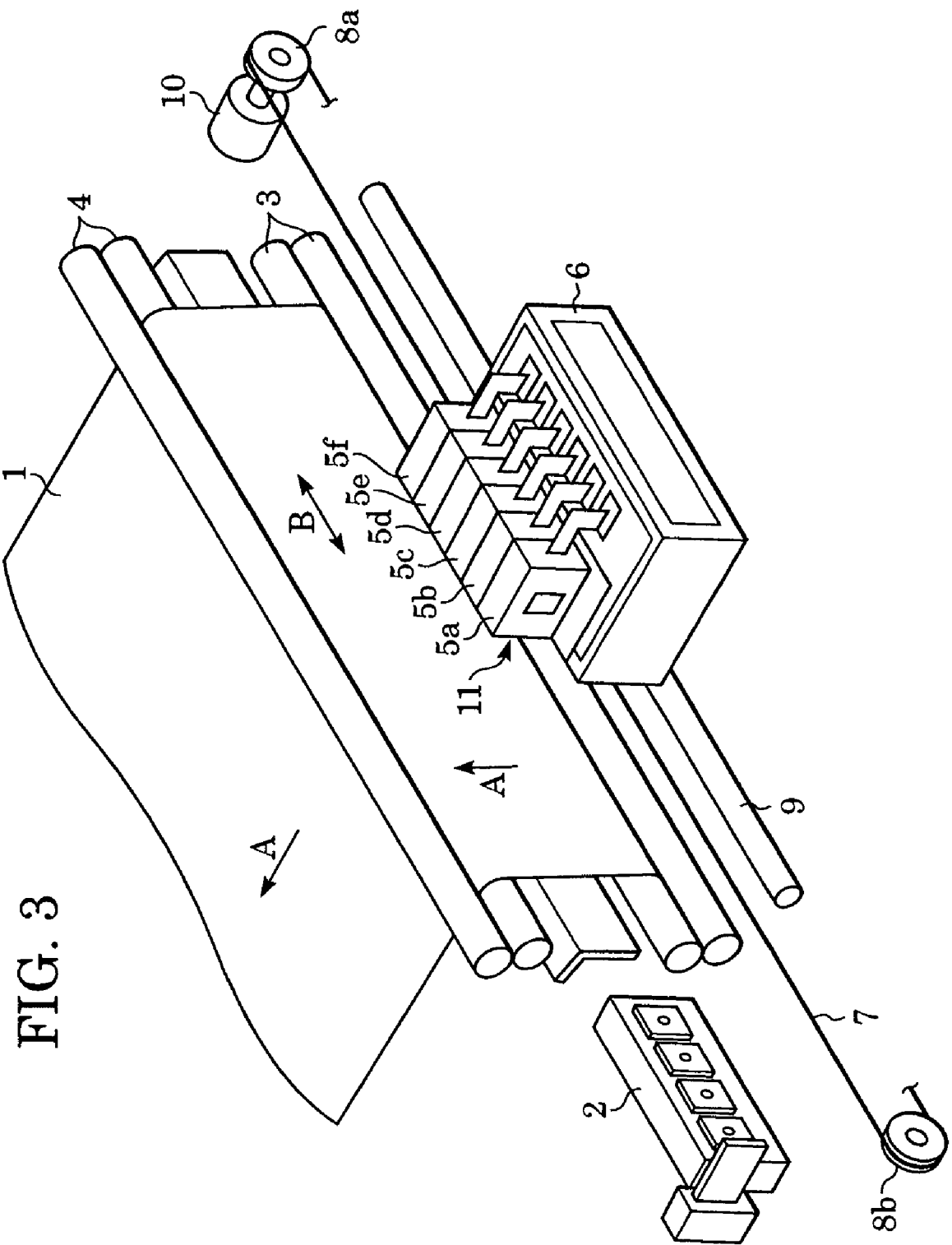
FIG. 3 shows the internal structure of an ink-jet recording apparatus according to an embodiment of the present invention.

FIG. 3 shows the internal structure of an ink-jet recording apparatus according to the first embodiment of the present invention. Reference numeral 1 denotes a recording medium such as a plastic sheet. A plurality of recording media is placed in the form of a stack in a cassette (not shown) or the like. When recording is started, recording media is fed one by one by a feed roller (not shown) into a main part of the printer. Reference numeral 3 denotes a first transport roller pair, and reference numeral denotes a second transport roller pair. The first and second transport roller pairs are disposed at locations spaced apart by a distance as shown in FIG. 3. The first transport roller pair 3 and the second transport roller pair 4 are driven by different stepping motors (not shown) such that the recording medium 1 pinched by respective roller pairs is transported in a direction denoted by an arrow A.

Reference numerals 5a to 5f denote ink tanks for supplying inks to an ink-jet recording head 11, wherein black (K) ink is stored in an ink tank 5a, light cyan (LC) ink in an ink tank 5b, light magenta (LM) ink in an ink tank 5c, cyan (C) ink in an ink tank 5d, magenta (M) ink in an ink tank 5e and yellow (Y) ink in an ink tank 5f. The recording head 11 is disposed such that a plane of orifices for firing ink droplets faces the recording medium 1 held in a slightly tensioned fashion between the first transport roller pair 3 and the second transport pair 4. The recording head 11 may be constructed such that parts for firing respective six color inks are formed separately or they are integrated in a single piece.

The recording head 11 and the ink tank 5 are removably mounted on a carriage 6. A carriage motor 10 drives the carriage 6 via two pulleys 8a and 8b and a belt 7 such that the carriage 6 moves to and fro in direction denoted by an arrow B along a guide shaft 9.

Reference 2 denotes a recovery unit for maintaining the recording head 11. The recording head 11 returns to its home position at which the recovery unit 2 is disposed. The recovery unit 2 recovers the recording head 11 when the recording head 11 returns the home position. More specifically, the recovery unit 2 removes residual ink blocking orifices of the recording head 11.

In the recording operation, ink droplets are fired with proper timing from the recording head 11 in accordance with an image signal while the carriage 6 moves in directions denoted by the arrow B. Each time the recording head 11 scans the recording medium 1 once across the full width of the recording medium 1 while firing ink droplets, the recording medium 1 is moved forward by a fixed distance by the transport roller pairs 3 and 4. The scanning by the recording head 11 and moving the recording medium 1 forward are alternately performed thereby forming an image on the recording medium 1.

Figure 4:
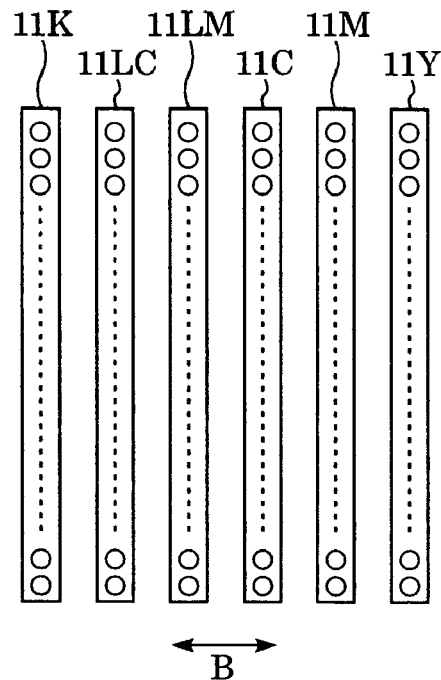
FIG. 4 is a schematic diagram showing a recording head including an array of orifices.

FIG. 4 schematically shows an array of ink firing orifices of the recording head 11. Line arrays of orifices for firing inks of respective color inks are arranged in the same direction as the direction denoted by the arrow B in which the carriage 6 is scanned, in the same order as that in which color inks stored in the ink tanks 5a to 5f. Many orifices for firing each color ink are arranged at intervals of about 40 μm in the same direction as the direction denoted by the arrow A in which the recording medium 1 transported. Each time the recording head 11 scans the recording medium 1 once, a line of an image with a resolution of, for example, 600 dpi (dots per inch) is formed on the recording medium 1.

In the present embodiment, it is assumed that an ink droplet of about 2 ng is fired from each orifice. The amount of each ink droplet is set to be 2 ng such that granularity of dots sparsely formed by black ink on a recording medium is not substantially perceptible when viewed from the distance of distinct view.

Figure 5:
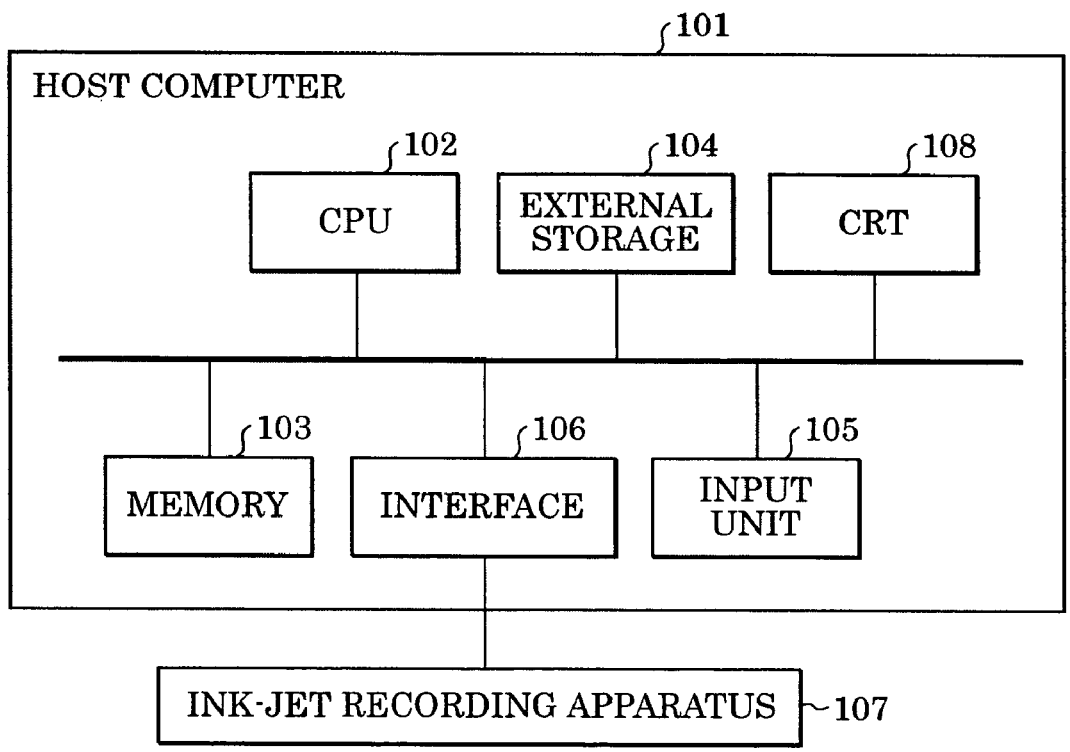
FIG. 5 is a block diagram showing an image processing system according to an embodiment of the present invention.

FIG. 5 is a block diagram showing an image processing system according to the present embodiment. A host computer 101 includes a CPU 102, a memory 103, an external storage unit 104, an input unit 105, a CRT 108, and an interface 106.

The CPU 102 performs various processes including image data conversion and recording by executing a program stored in the external storage unit 104. The memory 103 is used as a work area in the data conversion process. The memory 103 is also used to temporarily store image data. The program of processes such as image data conversion may be supplied to the host computer 101 from an external apparatus (not shown). A user inputs a command via an input unit 105 while viewing information displayed on the CRT 108.

The host computer 101 is connected to the ink-jet recording apparatus 107 via the interface 106. After image data is subjected to data conversion, the resultant image data is transmitted, under the control of the CPU 102, to the ink-jet recording apparatus 107. The ink-jet recording apparatus 107 performs recording in accordance with the received image data.

Figure 6:
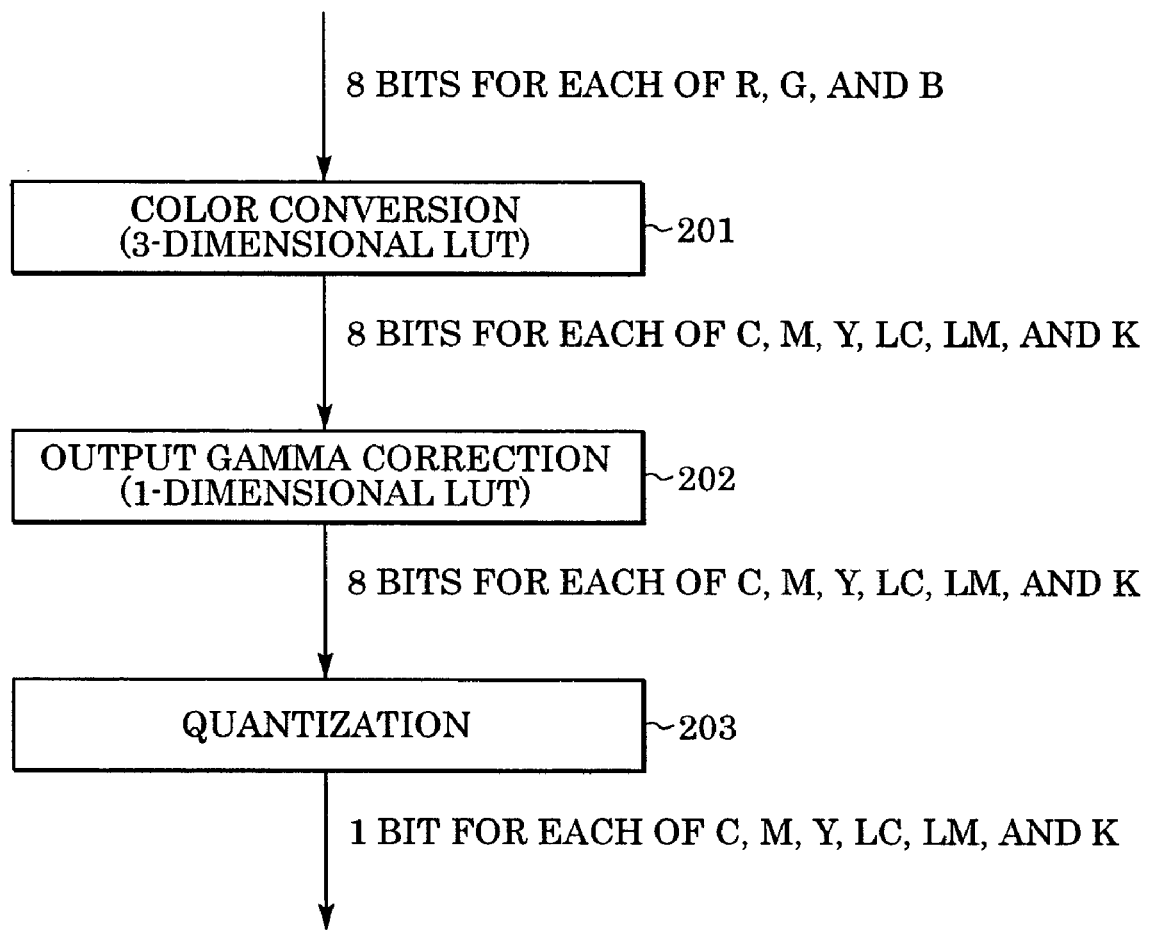
FIG. 6 is a block diagram showing an image data conversion process.

FIG. 6 is a block diagram of an image data conversion process performed by the CPU 102 according to the present embodiment. In the present embodiment, 8-bit (256-level) image data including red (R), green (G) and blue (B) luminance signals is converted to 1-bit data of cyan (C), magenta (M), yellow (Y), light cyan (LC), light magenta (LM), and black (K) in a form that can be handled by the ink-jet recording apparatus.

The 8-bit R, G, and B luminance signals are first input to a color conversion unit 201 and converted to luminance signals of C, M, Y, LC, LM, and K. In this color conversion process, a 3-dimensional color conversion lookup table (LUT) is used. More specifically, the CPU 102 refers to the lookup table and determines density signal values of C, M, Y, K, LC, and LM corresponding to a given combination of R, G, and B signal values. The lookup table does not have density signal values for all signal levels of R, G, and B signals but has only density signal values for particular discrete sets of R, G, and B signal levels. Therefore, the lookup table cannot be applied directly to all possible combinations of R, G, and B signal levels each taking one of 256 levels. In the present embodiment, for combinations of R, G, and B signal levels that are not described in the lookup table, density signal values are determined by means of interpolation using a plurality of data corresponding to a plurality of combinations of R, G, and B signal levels. Interpolation is well known in the art and a detail description thereof is omitted. The density signal values obtained via the color conversion process 201 are expressed in 8 bits as with the input values, that is, the luminance signal values. That is, each density signal has one of 256 signal levels.

After the color conversion process is performed by the color conversion unit 201, the image data is subjected to a conversion process performed by an output gamma correction unit 202. The output gamma correction unit 202 corrects the input luminance signals of respective ink colors such that the optical density finally represented on a recording medium of each color has a linear relationship with the input density signal of a corresponding color. In this process, the conversion is performed according to a 1-dimensional lookup table prepared for each color. The resultant signals output from the output gamma correction unit 202 are expressed in 8 bits as with the input values.

The 8-bit density data output from the output gamma correction unit 202 is supplied to a quantization unit 203 for quantization. In the ink-jet recording apparatus used in the present embodiment, the amount of each ink droplet fired from the recording head is fixed to 2 ng. Therefore, the density at each pixel on the recording medium is represented on two levels: one level obtained by recording a 2 ng ink droplet and the other level with no ink droplet recorded. If an area with a particular size including a plurality of pixels is viewed macroscopically, the color density for that area is the number of pixels recorded with ink droplets. This method of representing the density is called an area coverage modulation method. In a printer using the area coverage modulation method, quantization is required to convert multilevel data to 2-level data, as with the present embodiment. Known quantization techniques such as error diffusion or dithering may be used. After the image data is quantized by the quantization unit 203, the resultant 1-bit image data of each color is transferred to the ink-jet recording apparatus.

The above-described processes performed by the color conversion unit 201, the output gamma correction unit 202, and the quantization unit 203 are optimized depending on the type of recording medium used and/or the type of image formed on the recording medium. In particular, the lookup tables used in the color conversion process performed by the color conversion unit 201 and the output gamma correction performed by the output gamma correction unit 202 are prepared for each recording medium type.

Figure 7:
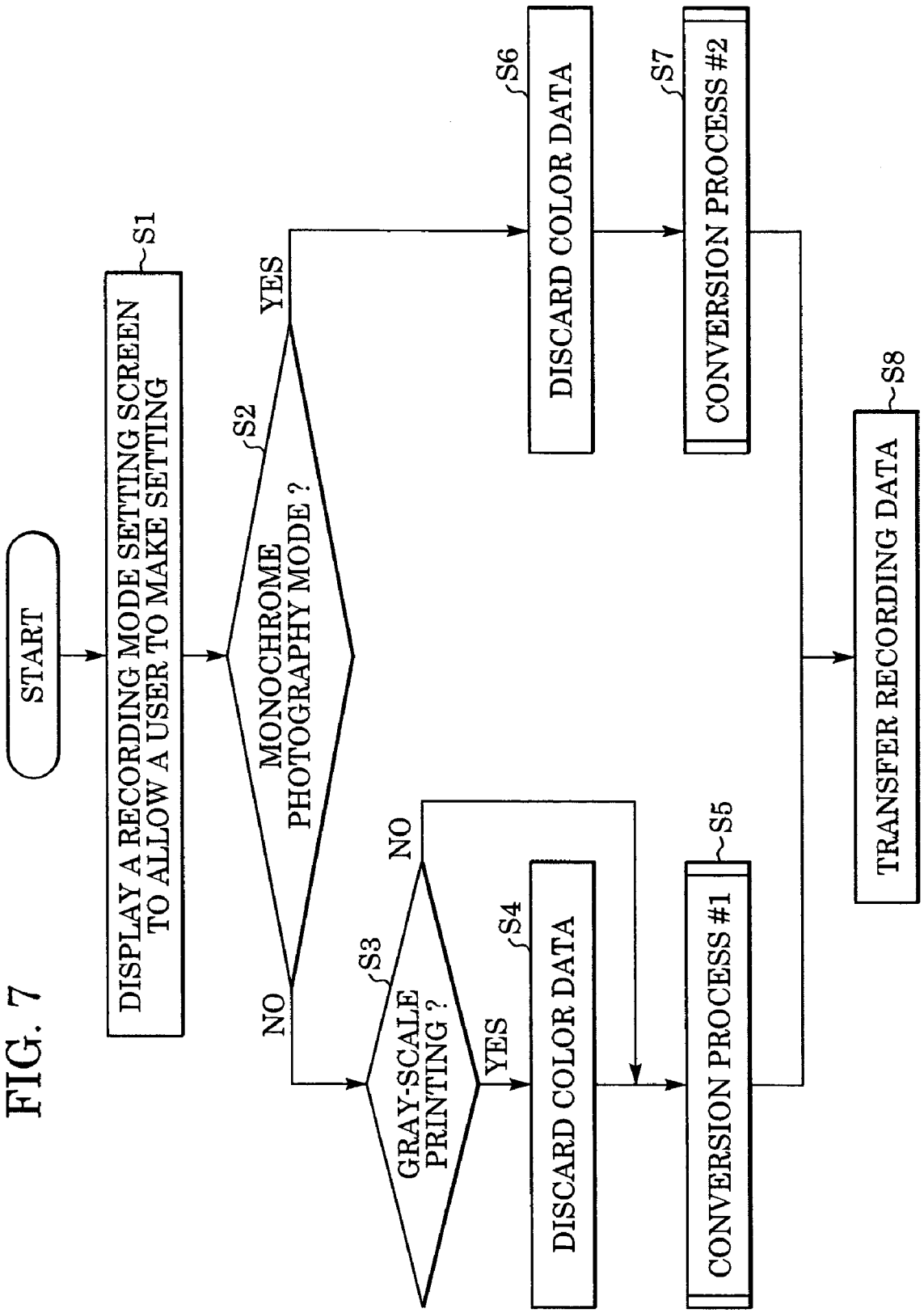
FIG. 7 is a flow chart of a pre-process performed by a printer in response to a record start command, before a recording process is actually started.

FIG. 7 is a flow chart of a pre-process performed by the printer in response to a start recording command issued by a user before actual recording is started. In response to the start recording command issued by the user, the CPU 102 displays a record mode selection screen on the CRT 108 (step S1).

Figure 8:
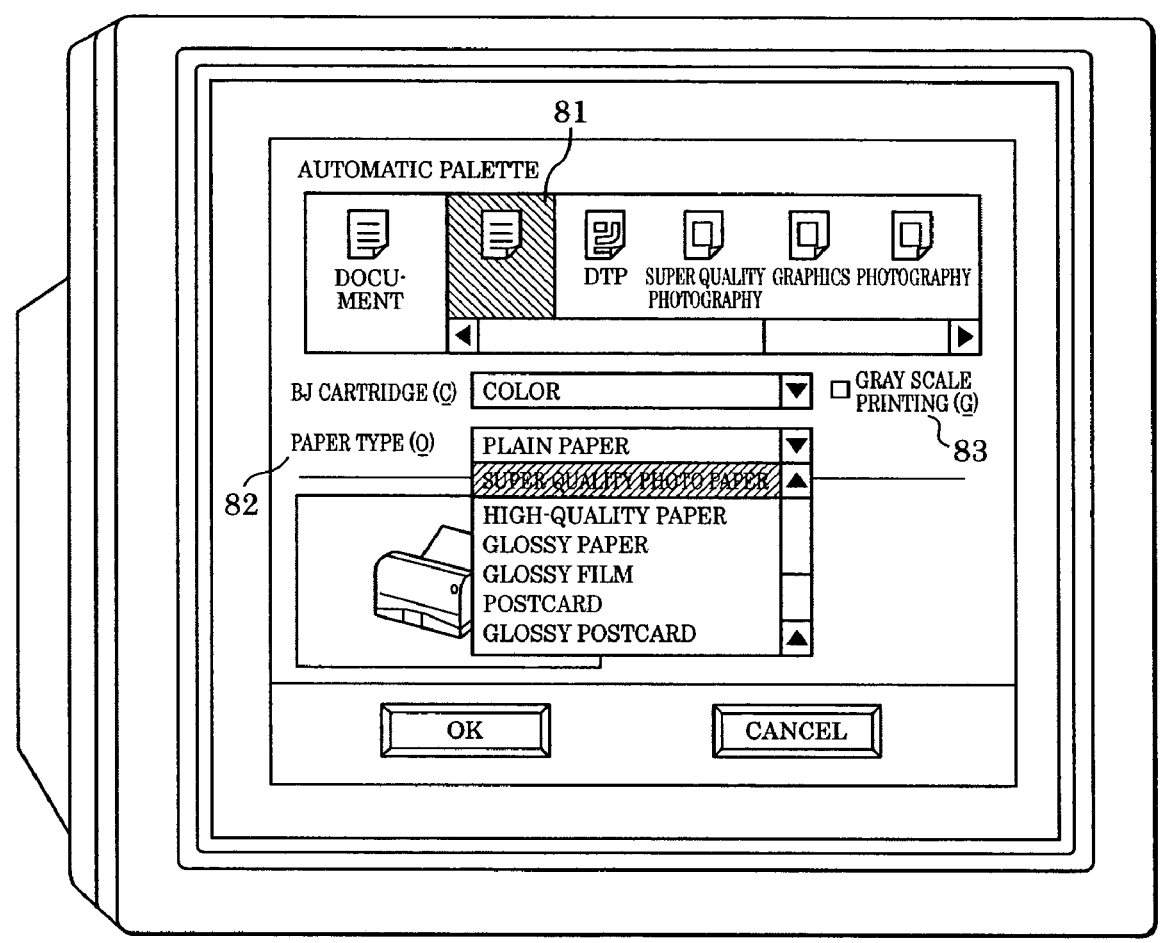
FIG. 8 is a diagram showing a recording mode setting screen displayed on a CRT.

FIG. 8 shows an example of such a screen displayed in step S1 on the CRT 108. In general, the ink-jet recording apparatus can handle several types of recording media. A recording method most suitable for the type of a recording medium used is selected from a plurality of available methods. The switching of the recording method is performed in accordance with a specified recording mode. The details of the recording method are set by the user by inputting data specifying recording conditions via a recording mode setting screen. An example of the recording mode setting screen is shown in FIG. 8. In the present embodiment, the user specifies the type of an image (document, picture, etc.) to be recorded via an auto palette 81. The type of a recording medium on which to record the image is selected via a paper type selection list box 82. A gray scale printing check box 83 is used to specify whether the image is to be recorded in the gray scale printing mode.

Referring again to FIG. 7, in step S2, it is determined whether the specified recording mode is a monochrome mode (monochrome photograph mode, in this embodiment). Note that in the present embodiment, the term "monochrome mode" refers to a recording mode that is applied when a monochrome photograph is output. This mode does not refer to all of the recording mode that is applied when gray scale printing is selected (using check box 83). To further emphasize this distinction, the term "monochrome mode" will herein be referred to as the "monochrome photograph mode". The monochrome photograph mode is applied when the gray scale printing is selected by checking the check box 83 and further super quality photo paper is selected in the paper type selection list box 82.

In a case in which it is determined in step S2 that the monochrome photograph mode is selected, the process proceeds to step S6. In step S6, RGB color information is discarded. More specifically, the RGB image signal is converted to a gray tone (R=G=B) luminance signal. If the luminance signal is denoted by L, the conversion can be achieved, for example, by substituting R, G, and B signal values into a conversion formula L=0.3R+0.6G+0.1B. Thereafter, in step S7, the conversion process #2 is performed. Note that the conversion process #2 is performed only when the monochrome photograph mode is selected. In the conversion process #2 in the monochrome photograph mode, density data for use in recording a gray scale image using a combination of inks, as will be described later with reference to FIG. 9, in accordance with a color conversion table dedicated to the monochrome photograph mode. In this conversion process #2, multilevel density signals of respective ink colors including black are produced such that more black ink is used than the other color inks over the entire density range including the low density range and the high density range. Note that the conversion process #2 includes the image data conversion process described earlier with reference to FIG. 6.

In step S2, if the specified recording mode is not the monochrome photograph mode, the process proceeds to step S3. In step S3, it is determined whether the check box 83 was checked in step S1 to specify gray scale printing. If the check box 83 is on, the process proceeds to step S4. In step S4, the RGB image signal is converted to a gray tone (R=G=B) luminance signal. Thereafter, the process proceeds to step S5. On the other hand, if it is determined in step S3 that the check box 83 associated with gray scale printing is off, the process proceeds directly to step S5 from step S3.

Figure 2:
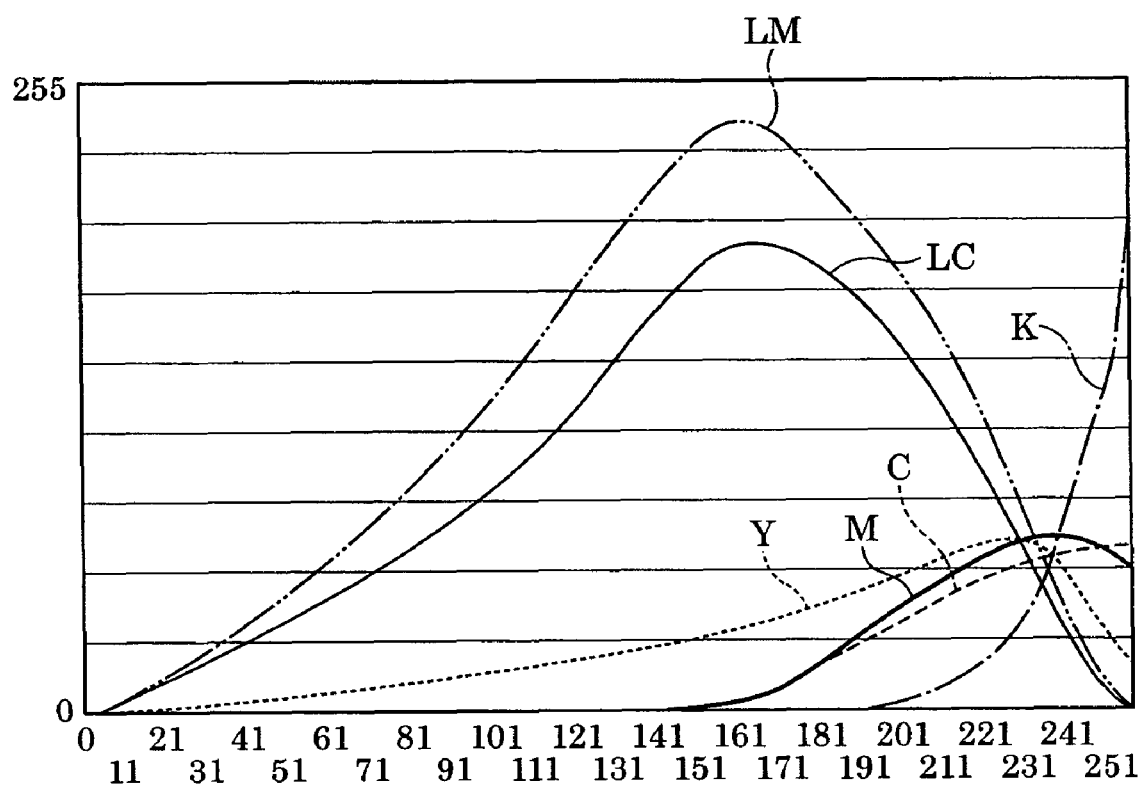
FIG. 2 is a graph showing ink output values when a gray scale image is recorded by a conventional ink-jet recording apparatus by using six color inks.

In step S5, a conversion process #1 is performed on the image data. As with the conversion process #2, the conversion process #1 also includes an image conversion process, but the details thereof are different from those of the conversion process #2. More specifically, in the case in which the process has proceeded directly to step S5 (without proceeding via step S4), the conversion process #1 in step S5 is performed such that multilevel density signals corresponding to respective color inks to be used to record a color image are produced based on a color conversion table, which is known in the art. On the other hand, in the case in which the process has proceeded to step S5 via step S4, the conversion process #1 in step S5 is performed such that multilevel density signals of respective ink colors for use in recording a gray scale image are produced as shown in FIG. 2 in accordance with the color conversion table prepared for use in the color mode.

After the image data is subjected to the conversion process in step S5 or S7, the resultant image data in the form of 2-level data is transferred to the ink-jet recording apparatus (step S8).

In the present embodiment, as described above, the monochrome photograph mode is applied only when super quality photo paper is selected as a recording medium. Therefore, in the conversion process #2 in step S7, a conversion method optimized for super quality photo paper is used. On the other hand, in the conversion process #1 (step S5), an optimum conversion method is selected depending on the type of the recording medium. More specifically, in the conversion process #1, depending on the type of recording medium other than super quality photo paper, a suitable lookup table is selected from a plurality of prepared lookup tables, the color conversion and the output gamma correction are performed using the selected lookup table.

Figure 9:
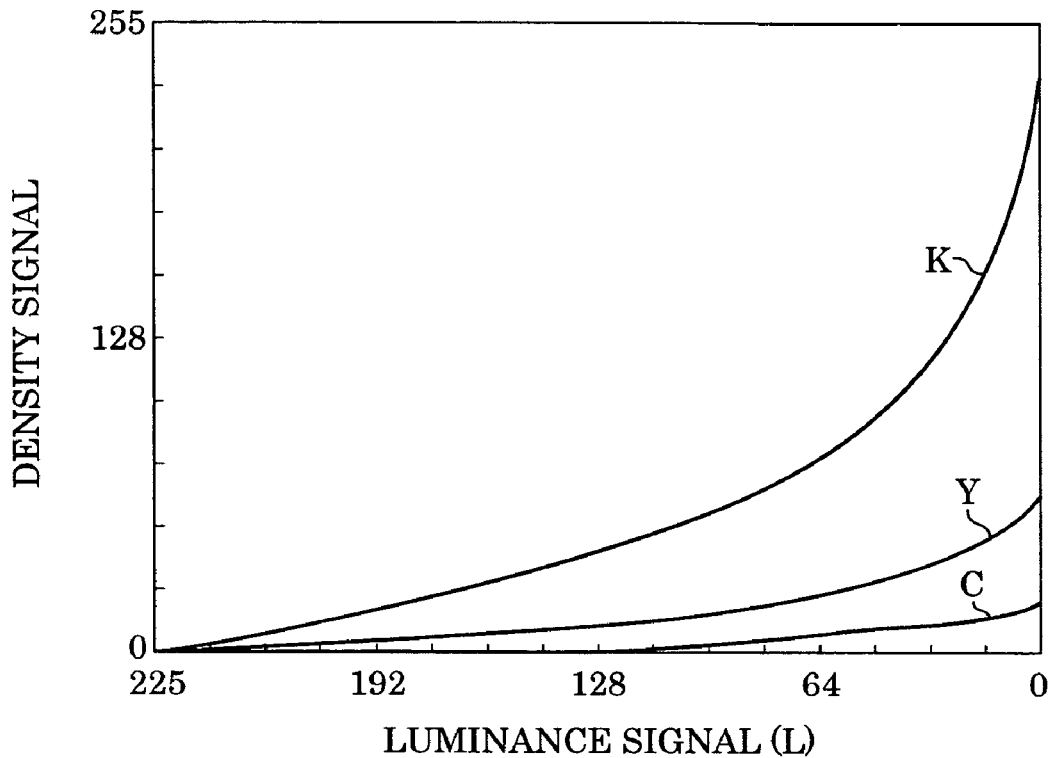
FIG. 9 is a graph showing an example of a color conversion process according to an embodiment of the present invention.

Referring to FIG. 9, the color conversion process in the conversion process #2 is described in further detail below. In FIG. 9, a horizontal axis represents the luminance signal (L) that can take a value in the range from 0 (black) to 255 (white). For luminance signal values close to 255 (white level) at the left end of the graph of FIG. 9, low density signals are output. Conversely, for luminance signal values close to 0 (black level) at the right end, high density signals are output. This means that the horizontal axis covers the range corresponding to the entire density range (entire gray level range) including the low density range and the high density range within which the density signals are output. A vertical axis represents density signals of respective color inks as a function of the luminance signal. The density signal can take a value in the range from a minimum value 0 (white) to a maximum value 255 (black). The amount of each color ink applied to unit region (one pixel region) increases with the density signal.

An advantage of the present embodiment is that the color conversion in the monochrome photograph mode is performed as described with reference to FIG. 9. On the other hand, in the conversion process #1, the color conversion is performed in a similar manner to the conventional color mode or monochrome mode. In particular, when a gray scale image is recorded, the conversion process may be performed in a similar manner as described earlier with reference to FIG. 2.

In the conventional monochrome mode, as can be seen from FIG. 2, the change in signal values is not monotonical, intersecting among different colors occurs at several points. This can cause color transition to occur, as described earlier in the section of Description of Related Art. In particular, when a recording head that fires a small amount of ink droplet is used as is the case with the present embodiment, a significant color transition tends to occur more frequently, which brings about a serious problem in forming a high-quality monotone image such as a monochrome photographic image.

In contrast, in the color conversion according to FIG. 9, the density value of black is always greater than other ink colors and changes monotonically in a highlight range in which the density is low and a high-density range. In the example shown in FIG. 9, the black luminance curve is plotted for a gamma value of 1.8, although the gamma value is not limited to 1.8.

In addition to black, cyan and yellow are used. The output signals of both cyan and yellow are at low levels over the entire range. In the present embodiment, these two chromatic colors, cyan and yellow, are used to compensate for recorded color deviation, and no other colors are used. In the example shown in FIG. 9, of the two chromatic color inks (cyan and yellow inks), one color ink (yellow ink) is used over the entire density range from the minimum density to the maximum density together with the black ink, and the other chromatic color ink (cyan ink) is used only in a density range higher than a middle level. As described above, it is difficult to represent gray, which is an achromatic color, using basic colors consisting of cyan, magenta, and yellow. Even when black ink is used to represent an achromatic color, a slight recorded color deviation can occur depending on the type of recording medium. In the present embodiment, to solve the above problem, in addition to black ink, cyan ink and yellow ink are used to compensate for the slight recorded color deviation that occurs when black ink is used to record on super quality photo paper. An advantage of the present invention is the use of one or more chromatic color inks to compensate for recorded color deviation that occurs when an image is formed using black ink. Thus, a high-quality monochrome photographic image, the tone of which is close to an ideal achromatic color, is provided.

The chromatic color is recorded even in the low-density range when black is recorded. However, the chromatic colors used herein are not used to reduce granularity and are not used as basic colors to form gray. Thus, the output curves increase monotonically in any density range without crossing one another. Thus, unlike the conventional monochrome mode described earlier with reference to FIG. 2, there is no color transition.

As described earlier, use of black ink in the highlight range can cause granularity. However, in the situation in which the amount of ink droplet used for each dot is so small that granularity of recorded dots when viewed from a distance is small, the problem may be with color transition and not with granularity. It should be noted that in recording a high-quality photographic image, the significance of granularity and color transition varies depending on the amount of ink droplet. That is, when the size of dots recorded on a recording medium is small and granularity is not a problem, it is preferable to suppress color transition than to suppress granularity.

The size and the perceptibility of granularity of dots formed on a recording medium depend on color and other characteristics of the recording medium. Therefore, for a given amount of ink droplet, it is difficult to determine whether granularity is a problem, unless the type of the recording medium used is taken into consideration. However, in general, for widely used ink-jet recording devices and for widely used recording media, it is desirable that the amount of ink droplet per dot be equal to or less than 5 ng, and more desirably equal to or less than 2 ng.

First Modification

In the example described above, only in the monochrome photograph mode in which gray scale printing and super quality photo paper is selected, is the color conversion process (conversion process #2) applied. However, the present embodiment is not limited to such an example. When the gray scale printing mode is selected, the conversion process #2 may be performed regardless of whether an image to be recorded is a photographic image. That is, the present embodiment may be applied regardless of whether an image to be recorded is a photograph, and the conversion process #2 may be performed whenever the monochrome mode is selected to record an image in gray scale. This makes it possible to prevent recorded color deviation and color transition from occurring, not only for monochrome photographic images but also for any image in gray scale.

Second Modification

Figure 10:
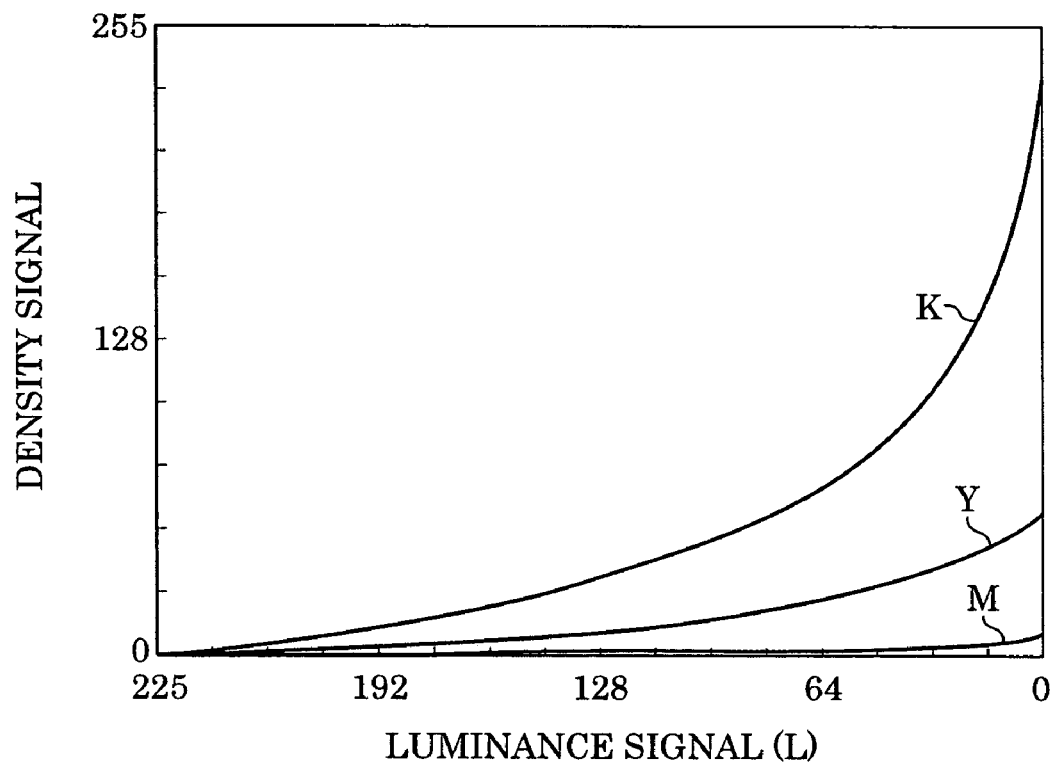
FIG. 10 is a graph showing an example of a color conversion process according to an embodiment of the present invention.

In the example described above, cyan and yellow are used as chromatic colors to compensate for the recorded color deviation in the monochrome mode as described above with reference to FIG. 9. However, the present embodiment is not limited to cyan and yellow as chromatic colors. Other chromatic colors may be used to compensate of the recorded color deviation, and the curves of chromatic colors may be properly defined depending on the type a recording medium and/or other factors. For example, when an image is recorded on a particular type of recording medium using only black ink, if the color tone of the resultant image is at a point deviated toward cyan from an ideal gray point in the color space, then yellow and magenta may be used as chromatic colors to compensate, as shown in FIG. 10. A combination of cyan and magenta may be used depending on the situation. In another example, a combination of low-density inks such as light cyan and light magenta may be used. Colors other than the six colors described above may be used. For example, red (R), green (G), and/or blue (B) may be used to compensate for black. The number of inks used for compensation is not limited to two. One color or more colors may be used.

That is, in the present embodiment, at least one chromatic color is used to cancel out a particular color saturation that occurs when an image is recorded on a particular type of recording medium using a black ink, and the density of the chromatic color ink used is set to be lower than the density of black ink over the entire density range in gray scale.

In the present embodiment, as described above, when the monochrome mode is selected, image processing is performed such that a black ink and at least one chromatic ink (for example, yellow ink) are used over the entire density range including the low density range and the high density range, and such that the amount of the black ink is dominant compared with the other color inks, thereby preventing the recorded color deviation and color transition from occurring.

Second Embodiment

Now, a second embodiment is described below. Herein, similar parts to the first embodiment are not described, and the following description will be focused on the difference from the first embodiment.

In the second embodiment, the color conversion process (conversion process #2) according to the present invention is performed in a plurality of monochrome modes in which different types of chromatic color inks are used together with an achromatic color ink. More specifically, the plurality of monochrome modes include a first monochrome mode in which a gray scale image is recorded using a black ink, a yellow ink, and a cyan ink as shown in FIG. 9, and a second monochrome mode in which a gray scale image is recorded using a black ink, a yellow ink, and a magenta ink as shown in FIG. 10.

The desirable gray tone depends on specific users. The provision of the plurality of monochrome modes makes it possible to handle a difference in user preference in terms of desirable gray tone. When a first gray scale image is recorded on a recording medium in the first monochrome mode and a second gray scale image is recorded on the same type recording medium (for example, plain paper) in the second monochrome mode, some users evaluate the first gray scale image as being better than the second gray scale image, but other users evaluate otherwise. In the first monochrome mode, a greater amount of cyan ink is used than in the second monochrome mode, and thus the first gray scale image gives users a cold impression compared with the second gray scale image. Users who like such a tone select the first gray scale mode. On the other hand, in the second monochrome mode, a greater amount of magenta ink is used than in the first monochrome mode, and thus the second gray scale image gives users a warm impression compared with the first gray scale image. Users who like such a tone select the second gray scale mode. Thus, by providing the plurality of monochrome modes in which different types of chromatic color inks are added to the achromatic color ink in recording a gray scale image a wide variety of user preferences can be processed.

Referring to FIG. 7, a processing flow according to the present embodiment is described briefly. The processing flow according to the present embodiment is similar to that according to the first embodiment described earlier with reference to FIG. 7, except for some steps (steps S1, S2, and S7). Thus, the following description will be focused on those different steps.

First, in step S1, a user makes setting associated with the monochrome mode via the driver screen displayed on the CRT 108 of the host computer. In the present embodiment, the driver screen includes two types of check boxes for selecting gray scale printing: first gray scale printing; and second gray scale printing. The user can select any one of these two types of check boxes. For example, if the user likes a cold gray tone image than a warm gray tone image, the user may select the first monochrome mode in which a resultant image tends to have a cold tone. Conversely, if the user likes the warm gray tone than the cold gray tone, the user may select the second monochrome mode in which a resultant image tends to have a warm tone.

In the next step S2, it is determined whether the selected recording mode is the monochrome mode such as the first or second monochrome mode. In the present embodiment, the monochrome mode is applied when the check box 83 is checked to select the first gray scale printing mode or the second gray scale printing mode.

In a case in which it is determined in step S2 that the monochrome mode is selected, the process proceeds to step S7 via step S6 to perform the conversion process #2 according to the present invention. The conversion process #2 in step S7 for monochrome photograph images includes a conversion process #2A and a conversion process #2B. If the first monochrome mode was selected in step S2, the conversion process #2A is performed. On the other hand, if the second monochrome mode was selected in step S2, the conversion process #2B is performed.

In the conversion process #2A, image processing is performed according to a first monochrome-mode color conversion table to produce density data for use in recording a gray scale image using a combination of inks as shown in FIG. 9. More specifically, multilevel density signals of respective ink colors consisting of black, yellow, and cyan are produced such that more black ink is used than the other color inks over the entire density range including the low density range and the high density range. On the other hand, in the conversion process #2B, image processing is performed according to a second monochrome-mode color conversion table to produce density data for use in recording a gray scale image using a combination of inks as shown in FIG. 10. More specifically, multilevel density signals of respective ink colors consisting of black, yellow, and magenta are produced such that more black ink is used than the other color inks over the entire density range including the low density range and the high density range.

Although the present embodiment has been described above with reference to the specific example in which yellow and cyan are used together with black in the first monochrome mode while yellow and magenta are used together with black in the second monochrome mode, the combinations of chromatic inks are not limited to those. For example, one type of chromatic color ink may be used or other combinations of two types of chromatic color inks may be used.

Figure 1:
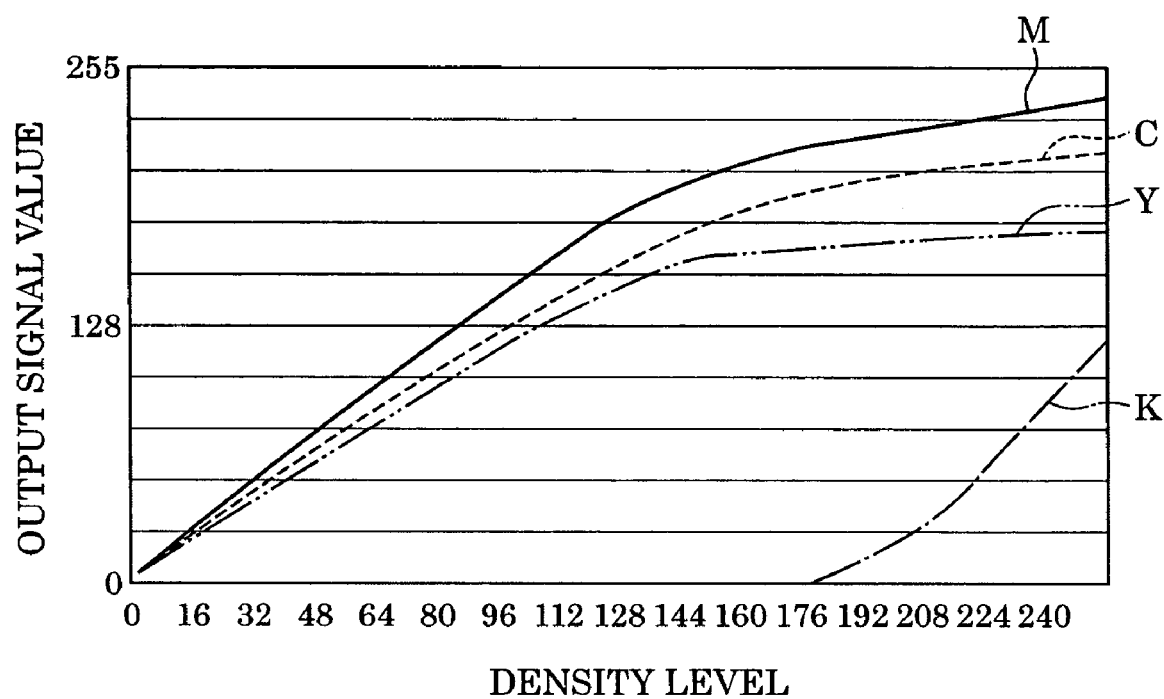
FIG. 1 is a graph showing ink output values when a gray scale image is recorded by a conventional ink-jet recording apparatus by using four color inks.

Three or more monochrome modes may be provided. For example, a third monochrome mode may be added in which a black (achromatic color) ink, a cyan ink, and a magenta ink are used. In another example, an additional monochrome mode may be added in which a color conversion table is used which is similar to the color conversion table for use in the conversion process #1 shown in FIG. 1 in the color mode, and a similar combination of inks to that shown in FIG. 2 is used.

In the present embodiment, the color conversion process (conversion process #2) according to the present invention includes a plurality of monochrome modes that are different in terms of the types of chromatic color inks used together with the black ink, thus, gray scale images with different tones can be produced. This provides, in addition to advantages similar to the advantages achieved by the first embodiment, the ability to handle a wide variety of user preferences.

Third Embodiment

Now, a third embodiment is described below. Herein, similar parts to the first embodiment are not described, and the following description will be focused on the difference from the first embodiment.

In this third embodiment, the color conversion process (conversion process #2) according to the present invention is performed in a plurality of monochrome modes that are different in terms of the types of chromatic color inks used together with black ink and one of these monochrome modes is selected depending on the type of a recording medium used. More specifically, the plurality of monochrome modes include a first monochrome mode in which a gray scale image is recorded using a black ink, a yellow ink, and a cyan ink as shown in FIG. 9, and a second monochrome mode in which a gray scale image is recorded using a black ink, a yellow ink, and a magenta ink as shown in FIG. 10, wherein the first monochrome mode is selected when a first type of recording medium (for example, super quality photo paper) is used, while the second monochrome mode is selected when a second type of recording medium (for example, photo paper or mat paper) is used.

The advantages obtained by providing the plurality of monochrome modes depending on the type of recording medium are as follows. The white color of many recording media varies depending on the type of recording media. If a gray scale image is recorded on different types of recording media using the same combination of inks, the resultant gray scale images are different in tone. There is a need for obtaining a gray scale image with similar tone when the image is recorded on a recording medium designed to record a photographic image, regardless of the type of the recording medium as long as it is designed to record a photographic image. To meet such a need for obtaining a gray scale image with a similar tone, the present embodiment provides monochrome modes (a first monochrome mode and a second monochrome mode) depending on the type of recording media (super quality photo paper and professional photo paper).

Referring to FIG. 7, a processing flow according to the present embodiment is described briefly. The processing flow according to the present embodiment is similar to that according to the first embodiment described earlier with reference to FIG. 7, except for some steps (steps S2 and S7). Thus, the following description will be focused on those different steps.

In step S2, it is determined whether the selected recording mode is the monochrome mode. In the present embodiment, the monochrome mode is applied when the gray scale printing is selected by checking the check box 83 and super quality photo paper or professional photo paper is selected in the paper type selection list box 82. More specifically, the first monochrome mode is applied when the gray scale printing is selected by checking the check box 83 and super quality photo paper is selected in the paper type selection list box 82, while the second monochrome mode is applied when the gray scale printing is selected by checking the check box 83 and professional photo paper is selected in the paper type selection list box 82.

In a case in which it is determined in step S2 that the monochrome mode is selected, the process proceeds to step S7 via step S6 to perform the conversion process #2 according to the present invention. The conversion process #2 in step S7 for monochrome photograph images includes a conversion process #2A and a conversion process #2B. If the first monochrome mode was selected in step S2, the conversion process #2A is performed. On the other hand, if the second monochrome mode was selected in step S2, the conversion process #2B is performed.

In the conversion process #2A, image processing is performed according to a first monochrome-mode color conversion table to produce density data for use in recording a gray scale image using a combination of inks as shown in FIG. 9. More specifically, multilevel density signals of respective ink colors consisting of black, yellow, and cyan are produced such that more black ink is used than the other color inks over the entire density range including the low density range and the high density range. Based on the multilevel density signals produced in the above-described manner, a gray scale image is recorded on super quality photo paper. On the other hand, in the conversion process #2B, image processing is performed according to a second monochrome-mode color conversion table to produce density data for use in recording a gray scale image using a combination of inks as shown in FIG. 10. More specifically, multilevel density signals of respective ink colors consisting of black, yellow, and magenta are produced such that more black ink is used than the other color inks over the entire density range including the low density range and the high density range. Based on the multilevel density signals produced in the above-described manner, a gray scale image is recorded on professional photo paper.

A similar tone is obtained in both the gray scale image recorded on the super quality photo paper and the gray scale image recorded on professional photo paper. That is, it is possible to satisfy the need for obtaining a gray scale image with a similar tone when the image is recorded on a recording medium designed to record a photographic image, regardless of the type of the recording medium as long as it is designed to record a photographic image.

The present embodiment provides two types of monochrome modes depending on whether the recording medium used is super quality photo paper or professional photo paper. In addition, the present embodiment may provide a third monochrome mode for use in recording a gray scale image on another type of recording medium other than super quality photo paper and professional photo paper. Chromatic color inks to be used together with an achromatic color ink may be selected such that a recorded gray scale image has a similar tone to that recorded on super quality photo paper or professional photo paper.

In the present embodiment, as described above, the color conversion process (conversion process #2) according to the present invention is performed in a plurality of monochrome modes that are different in terms of the types of chromatic color inks used together with a black ink, and one of the plurality of monochrome modes is selected depending on the type of recording medium used. This makes it possible to obtain a gray scale image with a similar tone, at least for any of particular types recording media.

Fourth Embodiment

In the first to third embodiments described above, when a monochrome photographic image is recorded, image processing is performed such that an achromatic color ink (for example, a black ink) and chromatic inks (for example, a yellow ink) are used over the entire density range including the low density range and the high density range as shown in FIG. 9 or 10, and such that the amount of the achromatic color ink is dominant compared with the chromatic color inks. However, the chromatic color inks may be used in a particular part of the density range.

Thus, in the present embodiment, the color conversion process (conversion process #2) in the monochrome mode is performed such that chromatic color inks are used in a particular part of the luminance signal range (in a particular part of the density range). However, as in the first to third embodiment, the achromatic color ink is dominantly used compared with the chromatic color inks in any part of the luminance signal range.

For example, the present embodiment is useful, in particular, in the following cases.

Strictly, the achromatic color refers to a color located at a point with a*=b*=0 in the a*b* plane of the CIE–L*a*b* space. However, in practice, most achromatic color inks used in ink-jet printers are not located at the point with a*=b*=0. That is, a* ≠0 and b* ≠0, and thus achromatic color inks have a slight chromatic color component. Such a slight chromatic color component is not visibly perceptible when dots are sparsely recorded. However, dots are recorded densely, the chromatic color component becomes visibly perceptible. In this situation, use of chromatic color inks in the highlight range is not desirable, and it is sufficient to use the chromatic color inks in the middle density range and the high density range. In view of the above, in the present embodiment, image processing is performed such that the chromatic color inks are used in the middle density range and the high density range, and such that a greater amount of achromatic color ink is used than the chromatic color inks in the middle density range and the high density range.

The present embodiment makes it possible to reduce the amount of chromatic color inks used, while suppressing the recorded color deviation in gray scale images.

Fifth Embodiment

Now, a fifth embodiment is described below. The fifth embodiment is similar to the first to fourth embodiments in terms of the structure of the apparatus and the manner of processing described earlier with reference to FIGS. 3 to 8. However, in the present example, professional photo paper is selected in FIG. 8. The lookup table used in the conversion process #2 shown in FIG. 7 may include an achromatic color ink and chromatic color inks as in FIG. 9 or 10 and may include only an achromatic color ink.

Figure 11:
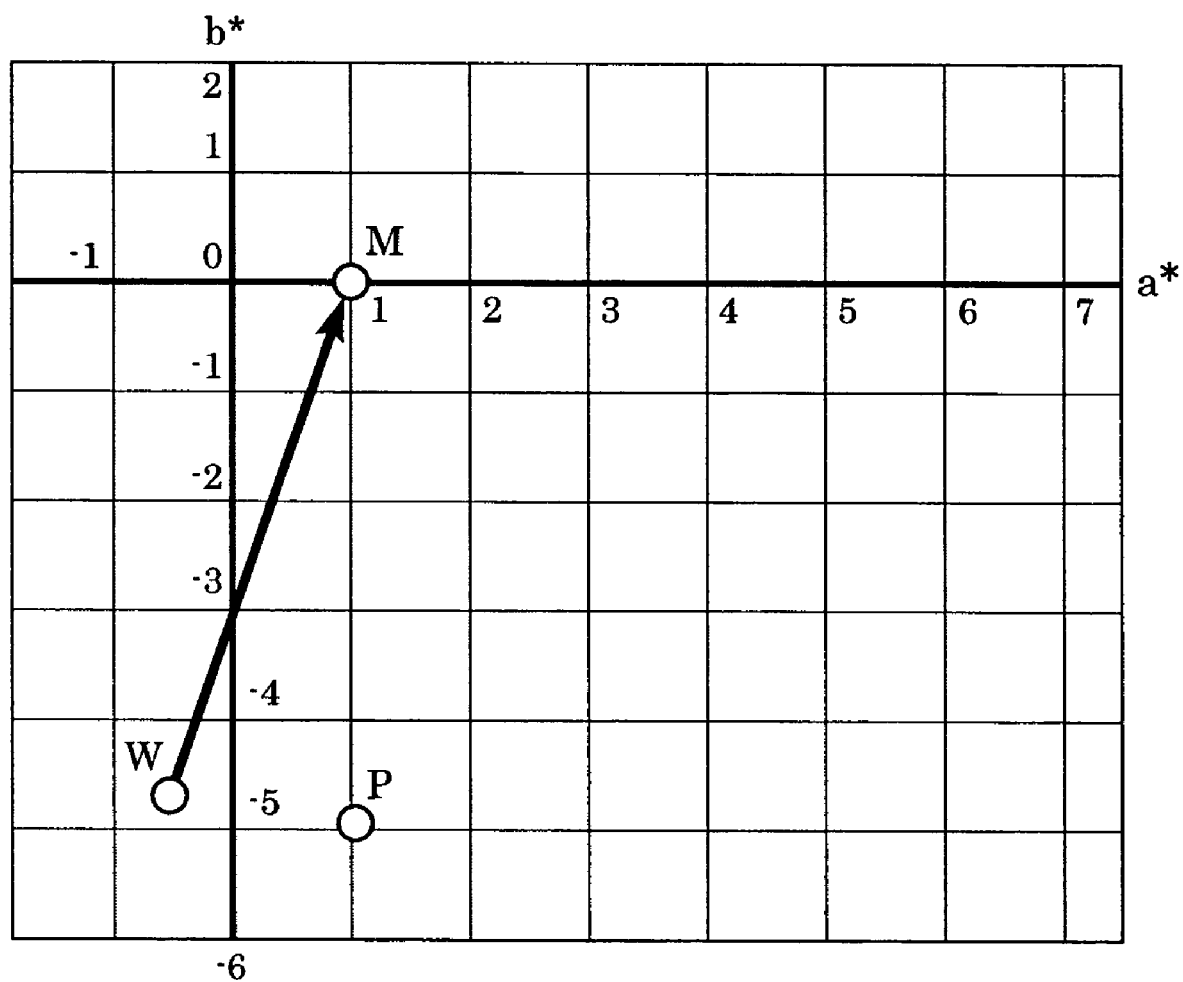
FIG. 11 shows positions in an a*b* plane for ideal gray and gray output according to a conventional image processing method.

A feature of the present embodiment is that the color conversion using a lookup table is performed such that the hue varies in the a*b* plane along a path denoted by an arrow in FIG. 11 so that the gray tone in the low density range and the middle density range which are important in monochrome photographic images can be improved.

Referring to FIG. 11, the monochrome mode according to the present embodiment is described below. As described above, in the monochrome mode, the R, G, and B multilevel luminance signals are equal to each other, that is, R=G=B. When R=G=B=255, nothing is recorded on a recording medium, that is, white color of paper is maintained. This state is denoted by W. W represents the coordinates of the original color (white) of the recording medium (professional photo paper) used in the present embodiment. If the recording medium has an ideal white color; its coordinates in a*b* plane are (0, 0). However, in practice, the position in the a*b* plane has a slight deviation from the origin as shown in FIG. 11. The magnitude and the direction of the deviation of W depend on the type of the recording medium. W corresponding to R=G=B=255 is the starting point of gray scale level and its position in the a*b* plane is specific to the recording medium. In the case of the professional photo paper used in the present embodiment the starting point W does not coincide in the a*b* plane with a neutral gray point M corresponding to a middle value of the multilevel luminance signal (R=G=B=128).

In the case in which the multilevel luminance signal (R=G=B) can take a value in the range from 255 (white) to 0 (black), when a monochrome photographic image is recorded using an ink-jet recording apparatus, the luminance signal most frequently has a value in a range from the white level (255) to the middle level (about 128). In the ink-jet recording apparatus, the surface of the recording medium is more filled with dots as the gray scale level increases (as the luminance signal level decreases). In general, an originally white area of the recording medium is fully filled with dots when the output density signal reaches the middle level corresponding to a luminance level of 128. This means that the original color tone of the recording medium does not affect the image color tone in the low luminance range (in the high density range) in which the luminance signal level is lower than 128.

From the above discussion, it can be seen that, in recording monochrome photographic images, it is desirable to obtain a gray scale tone as close to ideal gray as possible in the range from the white level (level 255) to the middle gray (level 128). More specifically, to record high-quality monochrome photographic images on particular types of recording media, it is desirable that an ideal gray tone be obtained at a luminance level of 128 at which an almost entire surface of white paper is filled with dots, and coordinates of recorded color in the a*b* plane directly move from the coordinates of the point W of the color of bare white paper to the coordinates of the ideal gray (neutral gray M) along the shortest path from W to M without significantly deviating from the path when the luminance level changes from level 255 to level 128. Thus, in the present embodiment, the lookup table is produced such that the coordinates move along the path denoted by an arrow in FIG. 11 in the color conversion process in the conversion process #2 shown in FIG. 7.

On the other hand, the color conversion process of the conversion process #1 is performed using a lookup table produced in accordance with the conventional image processing method. In this case, the coordinates of recorded color in the a*b* plane move from W to P along a curved path deviated from a linear path. Note that the conversion process #1 is applied in the normal color mode or the gray scale mode that is a mode for monochrome images other than photographic images. In this case, suppression of granularity of images or achievement of as high density of black as possible is more important than the gray halftone, and the deviation from the ideal path in the a*b* plane does not results in a significant problem.

Sixth Embodiment

Now, a sixth embodiment is described below. The sixth embodiment is similar in many respects to the fifth embodiment, and the following discussion will be focused on the difference. In the fifth embodiment described above, the lookup table used in the color conversion is produced such that the recorded color as close to the neutral gray M in the a*b* plane is obtained. In contrast, in the present embodiment, the hue of gray to be achieved is allowed to be set within a wider region in the a*b* plane.

Figure 12:
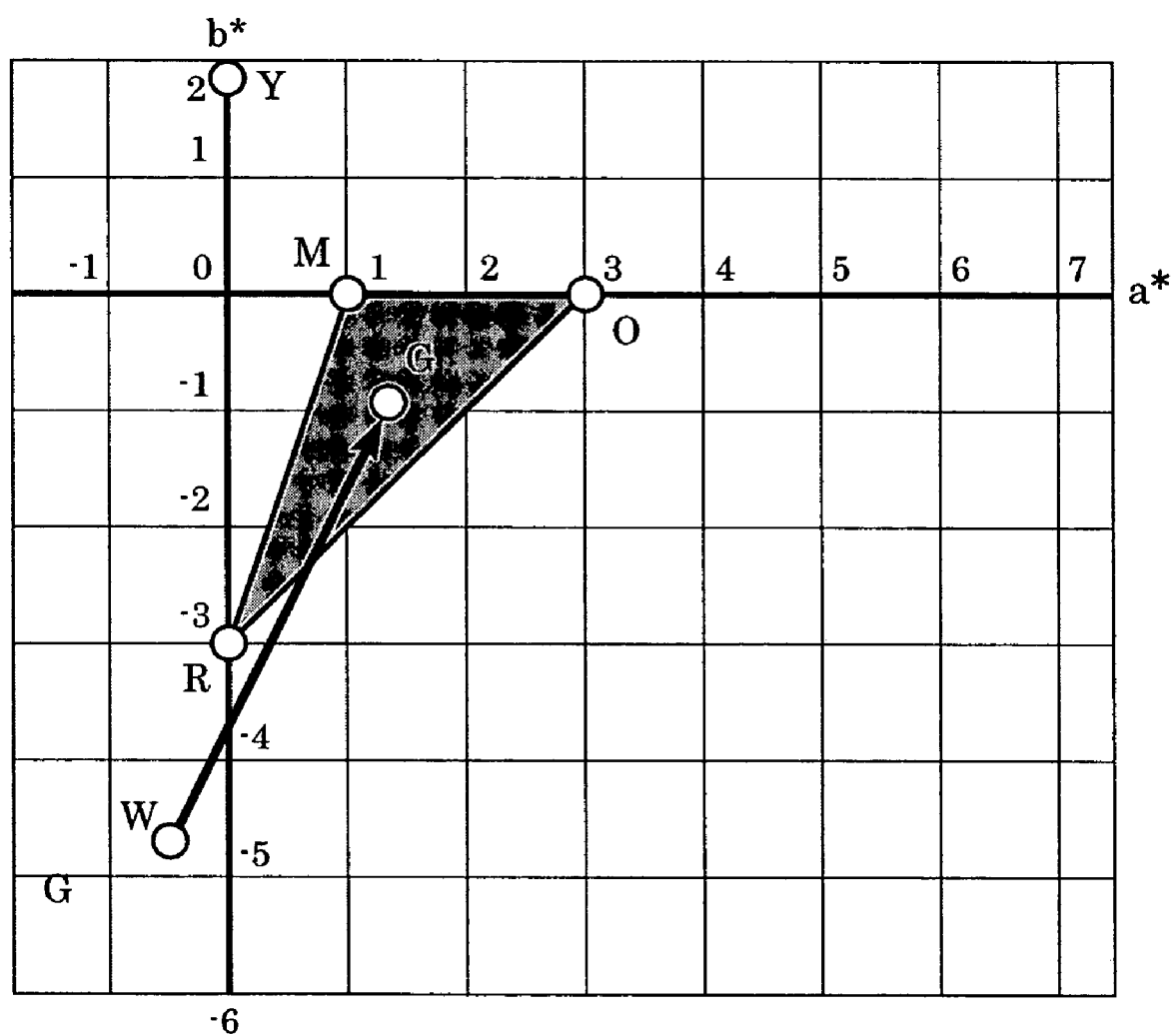
FIG. 12 shows a desirable gray region in the a*b* plane.

FIG. 12 shows a desirable gray area in the a*b* plane of the CIE–L*a*b* space allowable in the present embodiment. In FIG. 12, R denotes a hue called cold-tone gray at which a*=0 and b*=−3. O denotes a hue called warm-tone gray at which a*=3 and b*=0. The cold-tone gray and the warm-tone gray are not necessarily limited to the above-descried points in the a*b* plane, but they may be set to other points depending on the preference of users. Depending on users, not only in monochrome photographic images recorded using an ink-jet recording apparatus but also in silver-halide monochrome photographs, cold-tone gray or warm-tone gray may be preferable than neutral gray.

Figure 13:
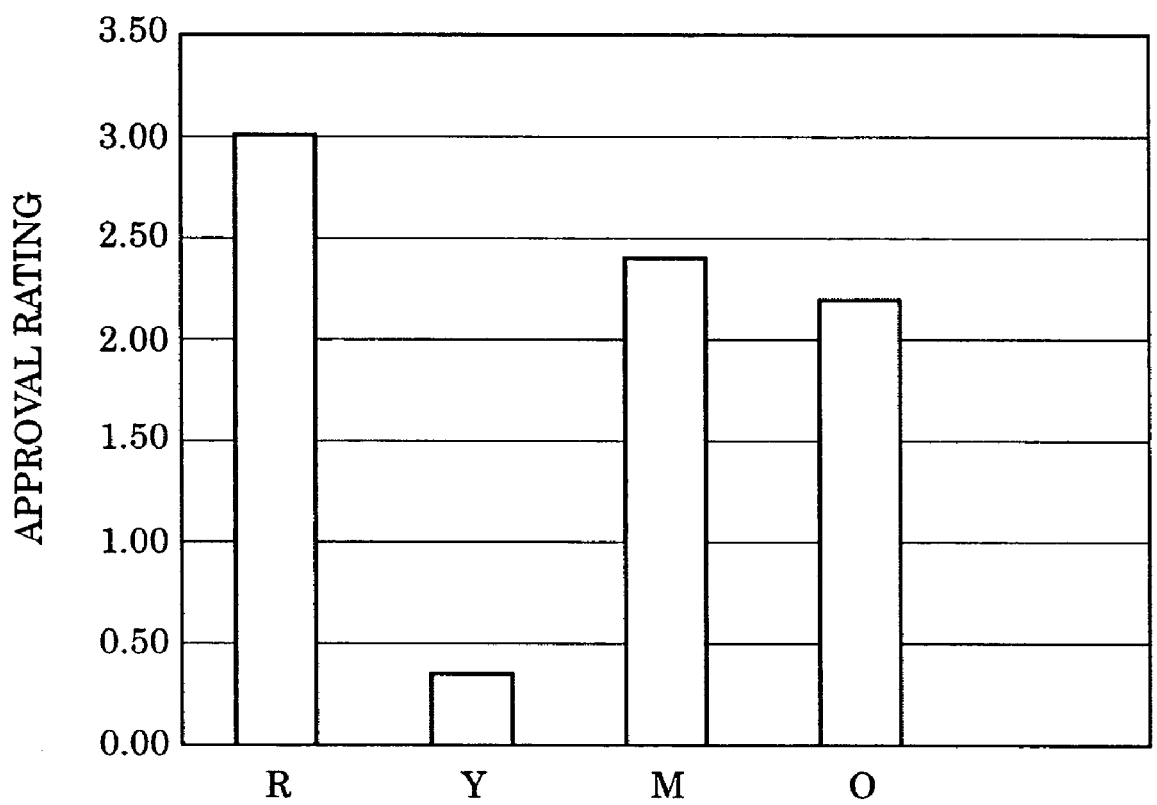
FIG. 13 shows a graph showing a result of a panel test.

FIG. 13 shows a result of a panel test for four gray colors, neutral gray M, cold-tone gray R, warm-tone gray O, and yellowish gray Y as a comparative sample. The yellowish gray Y is located at coordinates a*=0, b*=2 in the a*b* plane and the location is denoted by Y in FIG. 12.

In the panel test, four types of lookup tables are produced such that when gray color with the middle luminance signal level 128 is recorded on a particular type of recording medium according to respective lookup tables, hues are located at M, R, O, and Y in the a*b* plane. In accordance with the respective four types of lookup tables, monochrome photographic images are recorded on recording media of the same type as that used in producing the lookup tables. The approval rating is calculated in accordance with scores given by the respective panelists to the respective four types of recorded images. The resultant approval rating is shown in the form of a graph in FIG. 13.

In the panel test, the panelists are selected from people with a wide variety of backgrounds such as professionals, semi-professionals and amateurs without being biased to people with a particular background, and the panel test is performed fairly. A wide variety of images including portraits, landscapes, images with many high-density parts, and images with many low-density parts are used as samples subjected to the panel test.

As shown in FIG. 13, the cold-tone gray gained the highest arrival ratings. The neutral gray gained the next highest approval rating, and the next thereto is warm-tone gray. The yellowish gray tested as the comparative sample gained very low approval rating compared with the other gray colors although its location in the a*b* plane is near the neural gray.

A conclusion derived from the above-described panel test is that gray preferred by many people is not necessarily neutral gray but that located in a particular area in the lower right quadrant of the a*b* plane. That is, gray preferred by many people is located within a triangle whose vertices are located at M, R, and O that gained high scores in the panel test. Also, a higher score than that of the cold-tone gray is obtained when the lookup table is produced such that gray with a luminance level of 128 is located at the barycenter G of the triangle whose vertices are located at M, R, and O.

In the present embodiment, the lookup table used in the color conversion process in the conversion process #2 is then produced based on the above-described panel test. More specifically, the lookup table is produced such that when a monochrome image is recorded on a particular specified type recording medium in accordance with the lookup table representing the conversion correspondence between the multilevel luminance signal and the density signals of respective colors of inks used, the color corresponding to the multilevel luminance signal with the center value is located in the inside of, or on one of sides of, the triangle whose vertices are located at point R(0, −3), point M(1, 0), and point O(3, 0) in the a*b* plane. Thus, by using only one type of lookup table according to the present embodiment, gray images that are acceptable as excellent images by many users with a wide variety of backgrounds can be produced.

If desired, two or more types of lookup tables may be used. The provision of two or more types of lookup tables for use in the conversion process #2 makes it possible to output a color selected from various gray tones such as cold-tone gray, warm-tone gray, and neutral gray.

FIG. 9 shows an example of the correspondence between the luminance signal level and the density signal value for each ink color, which is applied when cold-tone gray according to the present embodiment is selected by a user. In this example, yellow and cyan are added at fixed ratios to black over the entire gray level range (over the entire density range or over the entire luminance density range) such that cold-tone gray that is slightly deviated toward blue from the neutral gray is obtained.

FIG. 10 shows an example of the correspondence between the luminance signal level and the density signal value for each ink color, which is applied when warm-tone gray according to the present embodiment is selected by a user. In this example, yellow and magenta are added at fixed ratios to black over the entire gray level range (over the entire density range) such that warm-tone gray that is slightly deviated toward red from the neutral gray is obtained.

In the correspondences shown in FIGS. 9 and 10, unlike that used in the conventional gray scale mode shown in FIG. 2, the signal values change monotonically and no intersection among colors occurs, and the hue changes along a substantially linear path in the a*b* plane without encountering an irregular or sudden change.

In the fifth and sixth embodiments described above, the color conversion process #2 according to the present invention is applied when professional photo paper is selected and a monochrome photographic image is recorded in the gray scale printing mode. However, in the present invention, the type of the recording medium is not limited to the professional photo paper. When two or more types of recording media are available to record a high-quality monochrome photographic image, the conversion process 2 may be used for all these types of recording media. In this case, a*b* coordinates of white color of bare paper vary depending on the type of recording media, although colors corresponding to the luminance level of 128 can be located at the same coordinates in the a*b* plane. Therefore, it is desirable that the lookup table be prepared for each type of recording media. The conversion process #2 may be used also for a monochrome image other than monochrome photographic images when the gray scale printing mode is selected.

In the fifth and sixth embodiment, the target hue located at M or the target triangular region in the a*b* plane is obtained when the luminance signal is equal to 128, that is, the center value of the full range of the luminance signal. However, in the present invention, the luminance signal is not limited to 128 at which corresponding location in the a*b* plane falls within such a region. As described earlier, when a monochrome photographic image is recorded using an ink-jet recording apparatus, gray levels most frequently appear in the range from the white level (at which the luminance level is 255 or the density level is 0) to the middle gray level. In this gray level range, the dot density varies from a state in which no dots are formed on a recording medium to a state in which the surface of the recording medium is entirely filled with dots. In the present invention, when the hue of a gray level is located in the target hue region, the dot coverage is substantially equal to 100%, that is, almost the entire surface of white recording medium is filled with dots. The luminance value at which the corresponding hue should fall within the target region is not necessarily close to 128 (middle value), but the luminance value varies depending on the amount of each ink droplet fired by the ink-jet recording apparatus used or depending on the recorded dot density. In the example of the recording apparatus used in the present embodiment, a substantial portion of the surface of white paper is filled with dots when the luminance level is equal to 128 (middle level), and thus the conversion correspondence is set such that the hue falls within the target region when the luminance level is 128.

Seventh Embodiment

In a seventh embodiment described below, one of the first to fourth embodiment and one of the fifth and sixth embodiment are combined.

That is, the conversion process #2 in the monochrome mode is performed such that (1) the multilevel luminance signal is converted to multilevel density signals such that the density signal for a color material of an achromatic color is always higher than the density signal for color materials of chromatic colors over the entire range of the multilevel luminance signal; and (2) the hue corresponding to the middle level of the full range of the luminance signal is located in the a*b* plane of the CIE–L*a*b* space, in the inside of, or on one of the sides of, a triangle whose vertices are at $(a^*, b^*)=(0, -3)$, $(a^*, b^*)=(1, 0)$ and $(a^*, b^*)=(3, 0)$.

The seventh embodiment can provide advantages similar to those achieved by one of the first to fourth embodiments and also advantages similar to those achieved by one of the fifth and sixth embodiments.

Other Embodiments

In the embodiments described above, the ink-jet recording system shown in FIG. 5 is used. However, in the present invention, the type of the ink-jet recording system is not limited to that. In the image forming system shown in FIG. 5, one or more parts thereof may be disposed in either the host computer or the ink-jet recording apparatus, or all parts may be disposed in a single apparatus.

Furthermore, also in the previous embodiments described above, all the conversion process described with reference to FIG. 6 is performed by the CPU 102 of the host computer 107, a part or all of the conversion process may be performed by the ink-jet recording apparatus 107. Inputting of data specifying the recording mode and setting associated with the specified recording mode described above with reference to FIG. 7 may be performed by the ink-jet recording apparatus.

The details of the recording mode setting screen are not limited to those shown in FIG. 8. In the example shown in FIG. 8, the recording mode setting screen includes the check box 83 for specifying the gray scale printing. The check box 83 is not necessarily needed. For example, the setting screen may be configured such that a user may set the hue and the color saturation of an image to be recorded, and the gray scale mode may be applied when the specified hue and the color saturation fall within particular range.

In the embodiments described above, the invention is applied to an ink-jet recording apparatus capable of recording an image using six color inks. However, the present invention is not limited to such an ink-jet recording apparatus, but the invention may be applied to a wide variety of recording apparatuses capable of recording a color image using a plurality of color materials. However, the recorded color deviation, color transition, and regularity are problems specific to ink-jet recording apparatuses, and thus the present invention is useful in particular when it is applied to ink-jet recording apparatuses. A wide variety of methods are known to fire ink droplets from an ink-jet recording head. Of those many methods, in particular, a method of firing small ink droplets to record a high-resolution image can receive great advantages of the invention. In other words, in the present invention, it is desirable that the recording head have a large number of densely disposed recording elements each including an electro-thermal transducer element.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2004-024841 filed Jan. 30, 2004 and Japanese Patent Application No. 2004-024843 filed Jan. 30, 2004, which are hereby incorporated by reference herein.

What is claimed is:

1. An image processing method, comprising steps of:
    specifying a monochrome mode capable of using achromatic ink and chromatic ink to form a monochrome image; and
    converting a multilevel luminance signal corresponding to the monochrome image to be formed by the monochrome mode specified in the specifying step to multilevel density signals respectively corresponding to the achromatic ink and the chromatic ink,
    wherein the number of the chromatic inks that can be used in the monochrome mode is one or two, and
    wherein in the converting step, the multilevel luminance signal is converted to the multilevel density signals corresponding to the achromatic ink and the chromatic ink such that both the achromatic and the chromatic ink are used in the monochrome mode specified in the specifying step for forming the monochrome image, such that a value of the multilevel density signal corresponding to the achromatic ink is greater than a value of multilevel density signal corresponding to the chromatic ink over the entire range of the multilevel luminance signal, and such that a magnitude relationship of the multilevel density signal corresponding to the chromatic ink does not change.

2. An image processing method according to claim 1, wherein the achromatic ink is a black ink and the one or two chromatic inks are one or two of cyan ink, a magenta ink and a yellow ink.

3. An image processing method according to claim 1, further comprising setting a gray scale printing mode; and
    selecting a recording medium to be used to form an image from a plurality of recording media including predetermined recording medium,
    wherein the monochrome mode is specified in the specifying step, if the gray scale printing mode is set in the setting step and the predetermined recording medium is selected in the selecting step.

4. An image processing method comprising steps of:
specifying a first monochrome mode, capable of using achromatic ink and at least one chromatic ink to form a monochrome image, or a second monochrome mode, capable of using the achromatic ink and at least one chromatic ink different from the at least one chromatic ink that can be used in the first monochrome mode, in which to form the monochrome image; and
converting a multilevel luminance signal corresponding to the monochrome image to be formed by the first monochrome mode or the second monochrome mode specified in the specifying step to multilevel density signals corresponding to the achromatic ink and the chromatic ink that can be used in the first monochrome mode or the second monochrome mode specified in the specifying step,
wherein in the converting step, the multilevel luminance signal is converted to the multilevel density signals corresponding to the achromatic ink and the chromatic ink such that both the achromatic and the chromatic ink are used in the monochrome mode specified in the specifying step for forming the monochrome image, such that a multilevel density signal corresponding to the achromatic ink has a value greater than the value of the multilevel density signal corresponding to the chromatic ink that can be used in the first monochrome mode or the second monochrome mode specified in the specifying step over the entire range of the multilevel luminance signal, and such that a magnitude relationship of the multilevel density signal corresponding to the chromatic ink does not change.

5. An image processing method according to claim 4, wherein in the specifying step, the first monochrome mode or the second monochrome mode is specified according to an instruction from a user.

6. An image processing method according to claim 4, wherein the chromatic ink that can be used in the first monochrome mode includes yellow ink and cyan ink but not magenta ink and the chromatic ink that can be used in the second monochrome mode includes yellow ink and magenta ink but not cyan ink.

7. An image processing method according to claim 4, wherein in the specifying step, the first monochrome mode or the second monochrome mode is specified depending on the type of the recording medium to be used to form the monochrome image.

8. An image processing apparatus, comprising:
a specifying unit configured to specify a monochrome mode for forming a monochrome image by using achromatic ink and chromatic ink; and
a converting unit configured to convert a multilevel luminance signal corresponding to the monochrome image to be formed with the monochrome mode specified by the specifying unit to usage amount signals relating respectively to usage amounts of the achromatic ink and the chromatic ink,
wherein the number of the chromatic inks that can be used in the monochrome mode is one or two, and
wherein the converting unit is configured to convert the luminance signal to the usage amount signals corresponding to the achromatic ink and the chromatic ink such that both the achromatic and the chromatic ink are used in the monochrome mode specified in the specifying step for forming the monochrome image, such that the usage amount of the achromatic ink in the usage amounts of the achromatic ink and the chromatic ink is the greatest over the entire range of the multilevel luminance signal, and such that a magnitude relationship of the multilevel density signal corresponding to the chromatic ink does not change.

9. A computer-readable medium having stored thereon a program for causing a computer to execute a process of performing signal processing on a signal corresponding to an image to be formed, the process comprising steps of:
specifying a monochrome mode capable of using achromatic ink and chromatic ink to form a monochrome image; and
converting a multilevel luminance signal corresponding to the monochrome image to be formed by the monochrome mode specified in the specifying step to multilevel density signals respectively corresponding to the achromatic ink and the chromatic ink,
wherein the number of the chromatic inks that can be used in the monochrome mode is one or two, and
wherein in the converting step, the multilevel luminance signal is converted to the multilevel density signals corresponding to the achromatic ink and the chromatic ink such that both the achromatic and the chromatic ink are used in the monochrome mode specified in the specifying step for forming the monochrome image, such that a value of the multilevel density signal corresponding to the achromatic ink is greater than a value of multilevel density signal corresponding to the chromatic ink over the entire range of the multilevel luminance signal, and such that a magnitude relationship of the multilevel density signal corresponding to the chromatic ink does not change.

10. A computer-readable medium having stored thereon a program for causing a computer to execute a process of performing signal processing on a signal corresponding to an image to be formed, the process comprising steps of:
specifying a first monochrome mode capable of using achromatic ink and at least one chromatic ink to form a monochrome image or a second monochrome mode capable of using the achromatic ink and at least one chromatic ink different form the chromatic ink that can be used in the first monochrome mode to form the monochrome image; and
converting a multilevel luminance signal corresponding to the monochrome image to be formed by the first monochrome mode or the second monochrome mode specified in the specifying step to multilevel density signals corresponding to the achromatic ink and the chromatic ink that can be used in the first monochrome mode or the second monochrome mode specified in the specifying step,
wherein in the converting step, the multilevel luminance signal is converted to the multilevel density signals corresponding to the achromatic ink and the chromatic ink such that both the achromatic and the chromatic ink are used in the monochrome mode specified in the specifying step for forming the monochrome image, such that a multilevel density signal corresponding to the achromatic ink has a value greater than the value of the multilevel density signal corresponding to the chromatic ink that can be used in the first monochrome mode or the second monochrome mode specified in the specifying step over the entire range of the multilevel luminance signal, and such that a magnitude relationship of the multilevel density signal corresponding to the chromatic ink does not change.

11. An image processing apparatus comprising:
a specifying unit configured to specify a first monochrome mode capable of using achromatic ink and at least one chromatic ink to form a monochrome image or a second monochrome mode capable of using the achromatic ink and at least one chromatic ink different from the chromatic ink that can be used in the first monochrome mode to form the monochrome image; and a converting unit configured to convert a luminance signal corresponding to the monochrome image to be formed with the first monochrome mode or the second monochrome mode specified by the specifying unit to signals relating to usage amounts of the achromatic ink and the chromatic ink to be used in the first monochrome mode or the second monochrome mode specified by the specifying unit, wherein in the converting step the luminance signal is converted to signals relating to usage amounts of the achromatic ink and the chromatic ink to be used in the first monochrome mode or the second monochrome mode specified by the specifying unit such that both the achromatic and the chromatic ink are used in the monochrome mode specified in the specifying step for forming the monochrome image, such that the usage amount of the achromatic ink in the usage amounts of the achromatic and chromatic inks that can be used in the first monochrome mode or the second monochrome mode specified by the specifying unit is the greatest over the entire range of the multilevel luminance signal, and such that a magnitude relationship of the multilevel density signal corresponding to the chromatic ink does not change.

* * * * *